(12) United States Patent
Pelz

(10) Patent No.: US 6,764,599 B1
(45) Date of Patent: Jul. 20, 2004

(54) METHOD FOR CONTROLLING WATERBORNE DISEASE ORGANISMS, PARASITES AND OTHER INFECTIOUS AGENTS

(75) Inventor: Richard A. Pelz, Mechanicsville, MD (US)

(73) Assignee: Circle C Oyster Ranchers Association, Inc.

( * ) Notice: Subject to any disclaimer, the term of this patent is extended or adjusted under 35 U.S.C. 154(b) by 0 days.

(21) Appl. No.: 10/426,811

(22) Filed: May 1, 2003

(51) Int. Cl.[7] .................................................. C02F 3/32
(52) U.S. Cl. ........................ 210/602; 210/747; 210/906; 210/908
(58) Field of Search ................................ 210/602, 630, 210/747, 170, 242.1, 903, 906, 908

(56) References Cited

U.S. PATENT DOCUMENTS

| | | | | |
|---|---|---|---|---|
| 4,086,161 A | * | 4/1978 | Burton | 210/602 |
| 5,337,516 A | * | 8/1994 | Hondulas | 47/65 |
| 5,389,257 A | * | 2/1995 | Todd et al. | 210/602 |
| 5,520,810 A | * | 5/1996 | Goudy et al. | 210/602 |
| 5,549,828 A | * | 8/1996 | Ehrlich | 210/602 |
| 5,628,904 A | * | 5/1997 | Bean | 210/602 |
| 6,391,201 B1 | * | 5/2002 | Pelz | 210/602 |

* cited by examiner

Primary Examiner—Fred G. Prince
(74) Attorney, Agent, or Firm—H. Jay Spiegel

(57) ABSTRACT

A method reduces levels of waterborne disease organisms, parasites and other infectious agents in open waters reducing their spread and improving it for man's uses. Large numbers of bivalve mollusks are used to filter infectious agents from moving water. The bivalve mollusks then process these agents by extracellular digestion, intracellular digestion or, encapsulation within the bivalve's feces or pseudofeces. The destruction of infectious agents is enhanced by sedimentation and the activities of benthic infauna. These benthic organisms may feed on the infectious agents or help to bury them by their burrowing activities. Additional sedimented material achieves sequestration and entombment of surviving infectious agents. The bivalve mollusks in the aquaculture system are harvested and disinfected destroying more of the infectious agents.

27 Claims, 15 Drawing Sheets

Floating Oyster Reefs

Breton Bay Watershed

Historic Oyster Bar Locations

These areas have hard bottom not suitable for the current invention.

METHOD FOR CONTROLLING WATERBORNE DISEASE ORGANISMS, PARASITES AND OTHER INFECTIOUS AGENTS

BACKGROUND OF THE INVENTION

The present invention relates to a method for controlling waterborne disease organisms, parasites and other infectious agents that afflict man, plants and animals, both domestic and wild. These infectious agents are a serious concern throughout the world. The disciplines of parasitology, epidemiology, epizootiology, and plant pathology have created nomenclature which is over-specific for the purpose of this invention. Various terms such as "infectious agent" or "pathogen" are used interchangeably in this application to include parasites, bacteria, protozoans, fungus, etc. and their infectious stages such as spores, oocysts, etc. that are injurious to man, plants and animals and are of a size which can be removed from the water by the filtration of bivalve mollusks.

The present invention combines knowledge from disparate disciplines within modern society, specifically, the bivalve mollusk growing industry and the public health sector covering an array of specialties, including but not exclusive to veterinary medicine, plant pathology and human health. Normally, these sectors are mutually exclusive for reasons explained in greater detail below. Applicant has found that the marriage of these disparate disciplines may provide results advantageous to them.

Numerous laws and powerful public opinion separate bivalve mollusk producers from those working to prevent the spread of communicable diseases. The present invention will require close cooperation between the disciplines to create any significant benefit.

Some of the biological processes in the present invention, which are described below, were just recently discovered by scientists in the human public health sector looking for ways to identify disease sources and monitor waterborne pathogens. The results of these studies have been viewed by some health and environmental officials as a reason to further restrict bivalve mollusk production. Pathogen/parasite contaminated waters and bivalve mollusk growing areas have historically been strictly separated in order to protect the public from waterborne disease organisms. However, these recent discoveries show that various bivalve mollusks are capable of destroying a variety of waterborne pathogens and parasites known to be very harmful to humans, animals and even plants to the point of injury or lethality (see FIGS. 1 and 2). FIG. 2 shows fluorescent In Situ Hybridization (FISH) and immunofluorescent antibody (IFA) images of *Giardia lamblia* cysts (panels A, B and C) and *Cryptosporidium parvum* oocysts (panel D). Viable *G. lamblia* cyst (panel A), nonviable *G. lamblia* cyst (panel B), and cyst shell (=nonviable cysts) with structural wall damage (arrow) (panel C) Viable *C. parvum* oocyst (arrow) and oocyst shells (nonviable oocysts) (arrow heads) (panel D). Note structural damage of the oocyst wall and a small gap between the oocyst wall and the internal structures of viable oocyst. Scale bar 20 micrometers in panels A, B and C; and 10 micrometers in panel D. See Graczyk, Thaddeus K., D. Bruce Conn, Ronald Fayer, David J. Marcogliese, Yves de Lafontaine, Alexandre J. Da Silva, Norman J. Pieniazek, *Asian Freshwater Clams (Corbicula fluminea) and Zebra Mussels (Dreissena polymorpha) as Biological Indicators of Contamination With Human Waterborne Parasites*, Aquatic Invaders, Volume 13, Number 4, Winter 2002. The present invention would in fact reverse the practice of complete separation in order to more fully protect the public, man's food supply and our living resources. The current practice of separation produces safer seafood in decreasing amounts. The present invention would greatly enhance public safety over the current practice by providing safer swimming areas, potable drinking water, safer irrigation water, and in fact, could even be used to produce safer seafood by decreasing the number of pathogens in bivalve mollusk growing areas. Historically, when disease outbreaks have occurred, there were legal battles and bad press for both sides. The divide between the two groups was further widened by longstanding laws strongly enforced by health and environmental officials.

Because of this, bivalve mollusks are normally produced in waters where pathogen levels are not a problem. Existing Domestic and Foreign Laws require that bivalve mollusks produced for human consumption come from uncompromised, unpolluted water. The National Shellfish Sanitation Protocol (NSSP) was developed by the Interstate Shellfish Sanitation Commission and is administered by the United States Food and Drug Administration. As new techniques come on line to identify these pathogens, bivalve mollusk production areas are shrinking. For example, closure of parts of Cuckold Creek, St. Inigoes Creek and Carthagena Creek by the Maryland Department of the Environment in October, 2002, illustrate this point. See FIGS. 3 and 4. New entrants into this field need to attempt to avoid pathogen polluted waters because they will not be allowed to sell their product. Established growers of bivalve mollusks avoid any mention of any waterborne disease in conjunction with their product. Bivalve mollusk producers' reputations are built by selling a safe and healthful food product to the public. To remain in business, they need to avoid waters polluted with disease organisms and, beyond that, even the mention of it.

Public health providers are members of a much larger group than bivalve mollusk producers. Because most disease monitoring prevention and control is done by them for the general public they see their task as providing a barrier between the public and diseases. To accomplish this, they prevent the harvest of contaminated bivalve mollusks or even bivalve mollusks that may have the possibility of contamination.

The most obvious source of waterborne pathogens from domestic sources is the point source which typically comes out the end of a pipe. The pathogens thus discharged usually come from poorly treated or untreated human sewage and wastewater. The owners of facilities with discharge pipes are required by law to clean up the water prior to its release. However, accidents can happen, including acts of nature, which produce spills containing infectious organisms. Older, overworked systems have plumbing failures and sometimes overflow when storm water mixes with wastewater. One prime example of an older overworked system can be found in Washington, D.C. There, storm water run-off and sewage are combined in the same pipes. Numerous other smaller municipalities from the same era followed the same engineering model. After major storm events the excess water causes many of them to have serious overflow problems. Applicant has been unable to find a single instance where success was achieved in cleaning up the body of water into which these systems overflowed. Instead, fines and penalties were imposed to discourage polluters from doing it again. The thrust of existing regulation and legislation is to punish all polluters in an effort to force intentional polluters to clean up the water. It is hard to envision, due to modern education and the severity of the penalties, that there are many intentional polluters left. If they accept punishment, they admit guilt and have less money to do what they are being asked to do. Admission of guilt is not a solution to the problem, and, as such, many releases just go unreported.

Because bivalve mollusk producers historically have been required to use clean water to grow their crop, they have not looked into intentionally growing bivalve mollusks in polluted waters using their "product" to reduce or remove the very pathogens that contaminate it. Until very recently no one knew how these pathogens were processed by the bivalve mollusks. Most of the literature dealing with this incorrectly assumed that the bivalve mollusks concentrate the pathogens making them more dangerous, or merely passed the infectious material on through, purging it from their bodies in a still viable form capable of contaminating other bivalve mollusks. Certainly no-one seemed to be considering these infectious agents as prey species dined on by bivalve mollusks. This was because the technology that allows the very identification of many of these smaller microbial problems has just come on line. One example is the MERIFLOUR test by Meridian Diagnostic Inc. See Thaddeus K. Graczyk, Ronald Fayer, Michael R. Cranfield, and David Bruce Conn, *In vitro Interactions of Asian Freshwater Clam (Corbicula fluminea) Hemocytes and Cryptosporidium parvum Oocysts*, Applied and Environmental Microbiology, July, 1997, p. 2910–2912. Bivalve mollusk growers are pressured by public health scares concerning food born illness caused by eating raw or partially cooked bivalve mollusks. Recently Ralph Nader promoted the idea that the sale of raw bivalve mollusks for human consumption should be banned entirely under federal law. The historical method, currently in use, for determining if bivalve mollusks are safe for human consumption is to look for more easily identified indicator bacteria in the water. The presence of these indicator organisms was believed to be a warning of the presence of fecal contamination by which enteric pathogens are transmitted. This method was determined to be flawed in 1986 in a study published by the United States Environmental Protection Agency (EPA) which showed a negative correlation between gastrointestinal illness of swimmers and the occurrence of the indicator bacteria *Escherichia coli*. This same EPA study called for an additional study to deal with the use of this same indicator organism in determining the extent of bivalve mollusk harvesting waters. Unfortunately, this call was ignored and the study was never done. The continued misidentification of clean water has further alienated the two disciplines. See *Ambient Water Quality Criteria for Bacteria*—1986, USEPA, Office of Water, Criteria and Standards Division, Washington, D.C. 20460, EPA440/5-84-002 (January, 1986, at p. 11, paragraph 2).

Because of the devastating economic impact on sales that immediately follows any reported outbreak of illness, or even the hint of a connection to this kind of event, new discharge points are strongly opposed by bivalve mollusk growers and harvesters alike. The recent deaths of 13 people in Cleveland, Ohio further illustrates this point. *Cryptosporidium parvum* which got through the city's drinking water treatment facility was determined to be the causative agent in these deaths. Press reports of this event included the fact that, several years before, this same organism had been found in Maryland oysters. The stories recalled other problems reaching back years. This information was released by the news media at the beginning of Maryland's oyster season in the fall of 2002, in the Washington D.C. area. The stories preceded an immediate drop in industry sales. No deaths or other health problems caused by *C. parvum* had actually been attributed to eating Maryland oysters.

Environmental groups have recently targeted the non-point source polluter, following events such as the recent Pfeisteria outbreak in Maryland waters of the Chesapeake Bay. Regulations were quickly written to control this newly recognized threat to public health. To the general public, a non-point source polluter usually means the "farmer". It also includes the run-off from forest land, urban streets and developed land. The farmer and other new targets of regulation are being told not to let any pollutants get into the water. This group is still putting together methods to comply with the new rules. The political division between non-point source polluters and bivalve mollusk producers is also growing stronger due to the way the Maryland's Pfeisteria outbreak was handled by politicians and the press.

Phosphorus fertilizer from chicken production farms was blamed for the outbreak. Reducing or stopping the release of phosphorus was seen as the solution to this problem. Using bivalve mollusks to reduce or control the numbers of this dinoflagellate were never discussed or considered as an alternative option. See *Blue Ribbon Citizens Pfiesteria Action Commission, Final Report*, November, 1997, printed by the Maryland Department of General Services; Graphics and Reproduction Services Department available online at http://www.dnr.state.md.us/bay/cblife/algae/dino/pfiesteria/hughes_commission_report.pdf.

Infectious agents are carried by water throughout the hydrological cycle. Man's activities as well as natural processes contaminate this water with pathogens every step along the way. Birds flying over swimming in, or perching over open water defecate, releasing the infectious stage of parasites and pathogens into open water. Beavers, muskrats and other mammals live in the water and are another source of infectious agents such as *Cryptosporidium parvum*. All forms of avian and mammalian life both wild and domestic require water and come to it to drink. This, combined with the normal bodily functions of these animals and direct contact with the water, release these infectious agents into the water. Run-off from land carries with it these same organisms and others from plants, various forms of wildlife, domestic animals and man. This is the natural dispersal method for these infectious agents in their search for a new host to parasitize so that they can multiply and carry on their species. These organisms are so small they can even hitchhike on dry materials that have been lifted into the air, picked up by the water droplets in clouds to fall with the precipitation.

Precipitation, usually in the form of rain, can fall directly on open water or on land. Rain and melting snow pick up microbes from the land and carry them to open water. This pathogen/parasite loaded water can get to open water rapidly in the form of run-off. Water from failed septic systems can seep through highly permeable soil into open water laden with bacteria, parasites and pathogens. This is even more pronounced in areas underlain by limestone deposits where water flows through cracks in the rock feeding underground streams and rivers. Water bearing these biological hazards eventually makes its way to open water such as ponds, streams, and lakes and then on to the ocean by way of our estuaries.

Man pumps water out of the ground and then returns it to the ground, in many cases contaminated with infective agents. Although most direct discharges of raw sewage into open water have been or are being dealt with, failed systems can release these microbes into open water.

Until recently, many boats had toilets with direct overboard discharge. The numbers of these are dropping but they still remain a problem in many areas and create a potential biological hazard.

Many forms of infectious agents have adapted to surviving long periods without a host in the environment. Adaptations such as small size, protective coatings and reduced metabolism allow them to withstand severe environmental factors such as drying, freezing and extreme heat. One example is *Cryptosporidium parvum* which is known to live and remain capable of infecting a host after 3 months in artificial seawater at 20° C. See Graczyk, Thaddeus K., C. A. Farley, R. Fayer, E. J. Lewis, and J. M. Trout, *Detection of Cryptosporidium Oocysts and Giardia cysts in the Tissues of Eastern Oysters* (*Crassostrea virginica*) *Carrying Principal Oyster Infectious Diseases*, Journal of Parasitology, 84(5), 1998, p. 1039. Because of this, infectious agents and parasites can travel long distances borne on water currents. Wherever and whenever the water flows with sufficient speed to keep them suspended, they will be carried along. Due to the slow sinking rate of some of the smaller of these organisms, they can be carried along in very slow moving water.

The present invention is intended to teach how the process of transmittal can be broken or reduced with the use of bivalve mollusks, by cutting the transference of infectious and parasitic agents from one host to the next. Many parasites and infectious agents have waterborne phases within their life cycle which can be interrupted by the present invention.

Water contaminated with infectious agents presents a number of problems for mankind. The motile flagellated asexual spores of Phytophthora are saprobes and parasites. The name of this group means "plant destroyer" and its members damage or destroy many kinds of agriculturally important plants. Others can be toxic as in the case of Pfeisteria, a fish parasite that produces chemicals toxic to man, or dangerous to human or animal health in other ways. These organisms are diverse and cover a wide range which includes micro fauna, flora, protista, chromyxa, bacteria, and fungi. They can be either infectious or parasitic in nature. Such microorganisms as Giardia, Cyclospora and Cryptosporidium can be debilitating or lethal to man. Water carrying these or other infective agents is of little use for drinking or irrigation without costly filtration processes such as reverse osmosis or nanofiltration. Even its recreational value is greatly reduced. This cost of course must be passed on to the consumer. Two-thirds of the households in Maryland depend on surface water sources for their drinking water. See Klein, Richard D., *Opportunities to Enhance Breton Bay*, published by the Potomac River Association, Jul. 11, 2001. These waterborne diseases also put at risk agricultural operations such as livestock production and restrict the use of this water for irrigation of crops. Irrigation water holding human infectious organisms is useless for vegetable and fruit crops, especially those destined to be eaten raw. Because of this, scientists have come up with numerous ways to correct the problem. Most of them deal with toxic chemicals or sterilization techniques to prevent these agents from entering the water or food supply. Our water systems are threatened by agents which are increasingly resistant to sterilization technology such as the life threatening parasite *Cryptosporidium parvum*. The cost of making the water safe rises dramatically and the risk can increase to the point that entire bodies of water can no longer be used or even considered for utilization. This places higher and higher demands on other sources such as aquifers which if overtaxed will collapse and be destroyed. With a growing population, this problem is not likely to go away in the near future and practical, efficient, and less expensive methods are needed to make open surface waters safe for use by mankind.

On riverine systems, one town's intake for potable water is downstream from another's wastewater treatment plant outfall. On long rivers like the Mississippi, the number of times water is reused from the head waters to it's final destination in the gulf of Mexico allows many chances for accidental introduction of infectious and parasitic agents harmful to man his living assets and society in general.

The present invention is a non-toxic, environmentally positive solution to the problem and does not produce a waste product, that must be disposed of. The present invention could be useful in re-opening areas for human uses that are currently closed to those uses.

Bivalve mollusks are highly efficient in capturing food by filtering small particulate matter from the water. As we now know, these infectious agents are bivalve mollusk food. The current invention takes advantage of this fact. One of three fates usually awaits these infectious agents once they have been filtered from the water: 1)Extracellular digestion destroys many of them within the gastrointestinal tract of the bivalve mollusk; 2)Intracellular digestion also takes place when these agents are phagocytized by the free ranging blood cells (amebocytes) (Barnes, p. 321) which directly bathe the tissues of bivalve mollusks. See FIG. 1; Photomicrograph showing migrating hemocyte of the Asian freshwater clam (*C. Fluminea*) with a phagocytosed *C. parvum* (strain AUCP-1) cocyst (arrow) and free, non-phagocytosed oocysts (arrowheads) Bar=10 $\mu$m. See Graczyk, Thaddeus K., Ronald Fayer, Michael R. Cranfield, and David Bruce Conn, *In Vitro Interaction of Asian Freshwater Clam* (*Corbicula fluminea*) *Hemocytes and Cryptosporidium parvum Oocysts* Applied and Environmental Microbiology, July 1997, p. 2911. 3)Those that escape the digestive processes are encapsulated in feces or pseudofeces and expelled by the bivalve mollusk in a form that rapidly sediments out due to large particle size and specific gravity. Once on the bottom, they may be further processed and digested by benthic deposit feeders planted or encouraged to colonize in the plume area (area of deposition described later in the inventive process). Those that are not destroyed by the above methods become candidates for burial through bioturbation or direct burial in the sediments by the additional material piled on top of them. They become entombed and can no longer cause harm. Over time these buried organisms will eventually senesce and die or be consumed by burrowing biota.

The method for controlling waterborne diseases and parasites of the present invention acts to remove these microbes from the water-column and destroy them or entomb them in the bottom; in either scenario they are eventually turned into harmless organic material. The present invention acts to interrupt the pathogen/parasite life cycle between hosts and therefore will have a positive effect on epidemiology, plant pathology and epizootiology.

As more material is deposited onto the bottom, these parasites and pathogens are buried and can remain there indefinitely unless disturbed. However, the life-span of these microbes is not indefinite and they eventually succumb. In this way, those parasites and pathogens that are not digested by the bivalve mollusk are removed from the water column through sedimentation. Encapsulation of parasites and pathogens in the sticky feces and pseudofeces produced by the bivalve mollusk virtually precludes their resuspension. So, they remain on the bottom and are buried as more and more particulate matter is added on top of them. This burial processes is further accelerated by a process known as bioturbation as active benthic organisms turn over the sediment.

The present invention teaches how bivalve mollusks can be used to remove infectious agents from open waters. A bivalve mollusk farm is known as a water purifying means. An example of such a farm is described in Sea Frontiers 1973. See Sea Frontiers, Volume 19, No. 6, November–December, 1973, p. 368–373. This article fails to teach the use of oysters in a natural body of water. Although the article teaches the use of oysters as a water purifying means, it fails to deal with the direct use of the bivalve mollusks as a method of controlling parasites and pathogens in a natural body of water.

The present invention significantly differs from Applicant's prior patent, U.S. Pat. No. 6,391,201 (the '201 patent).

Site selection for applicant's patented system requires a carbon source for the anaerobic bacteria needed in de-nitrification when reducing nutrient levels. Even more significantly, areas known or suspected of having disease organisms, parasites and other infectious agents that afflict man were a concern when choosing edible bivalves for post harvest value.

System deployment varies significantly between the present and prior invention in that the prior invention is defined as completely off bottom and set at specified distances from the surface. This was done to facilitate filtration by the bivalves of specific strata within the water column. The present invention is designed to filter the entire volume of water to maximize the removal of the target organisms.

Use of the respective systems differs significantly as well. The goal of the prior invention is to change the chemical composition of areas of open water in order to control environmental fertility levels. To do this, in part, the prior invention controls population levels of organisms capable of photosynthesis. The present invention, on the other hand, is used to lower levels of an entirely different group of target organisms, specifically ones capable of causing disease, parasitizing hosts or producing infections. The present invention is deployed to remove these organisms from areas of open water making that water safe for a variety of uses. Photo-synthetic capability of these organisms is not a criteria for targeting them.

SUMMARY OF THE INVENTION

The present invention relates to a method for controlling waterborne infectious agents. The present invention is designed to return polluted waters to conditions that can again facilitate production of food, be used for recreation, and be healthy areas for water dependent human activities.

The present invention can also be used to reduce the number of infectious agents for potable water supplies, agriculture and other uses. Examples of agricultural uses would be to treat water in ponds used for irrigation of vegetables, fruit, livestock forage or other crops or for watering livestock. The present invention provides a method of biological control for the reduction and destruction of these infectious agents. It provides a means to remove these organisms from the water column in open waters. The goal of these removal efforts is to either reach levels that are non-infectious or to lower levels to a point where they can be more easily and less expensively treated for use of the water. In this regard, it is known that there is an exposure level threshold below which certain infectious agents are not capable of causing disease. Once in place, the present invention can be employed to maintain the desired reduced levels.

The present invention can be used in eutrophic, mesotrophic, and oligotrophic conditions; in fresh, estuarine and salt water, and from the tropics to the sub arctic. The present invention can be practiced anywhere that large numbers of filter feeding bivalve mollusks, which produce pseudofeces, can be retained and where phytoplankton production can be counted on to support them. If these first two criteria are met, the third component, removal of infectious agents, is certain. In certain instances, greater success can be achieved when the present invention is coupled with a Biological Nutrient Control System (BNC™) as disclosed in Applicant's prior U.S. Pat. No. 6,391,201, and be located in slow to intermediate water flow. However, this flow can be provided by mechanical means whenever necessary, such as pumps, blowers, paddle wheels, etc., and fast currents can be slowed with weirs, dams or other means.

The present invention consists of a process starting with waterborne infectious agents entering a water body from a variety of sources. Such sources include point sources and non-point sources which include but are not limited to land runoff, ground water, precipitation, release from disturbed bottom sediments, directly introduced by animals, and deposition of materials by wind.

Within the water body, the invention is effective on those waterborne microscopic infectious agents known to be of a particle size normally filtered from the water by bivalve mollusks when actively feeding, with one caveat. The invention is not designed to be effective against infectious agents that adversely effect the health of the mollusks in the arrays.

By preference, bivalve mollusks that produce pseudofeces are held in aquaculture production and used to filter waterborne microscopic disease organisms and parasites from the water. Non-pseudofeces producing bivalves are less effective (see 1 below) In the course of feeding on an assortment of particulate and colloidal materials found in the water, the bivalve mollusks process this material in two (2) ways:

1) Particles that are too large or too heavy for the bivalve mollusks to consume are sorted, and then incorporated into sticky pseudofeces that are then ejected back into the water. The pseudofeces then falls to the bottom. This sorting process does not break down these particles and the particles may have attached to them or embedded in them live infective agents which are incorporated into the pseudofeces.

2) Particles suitable for food are ingested followed by digestion either extracelluarly or intracellularly (wherein the particles are phagocytized by hemocytes). Extracted nutrients are incorporated into the bivalve mollusks, inactivated particles are incorporated into solid waste and any live infectious agents that survive the digestive process are encapsulated in the feces. See Craczyk, Thaddeus K., D. Bruce Conn, Ronald Fayer, David J. Marcogliese, Yves de Lafontaine, Alexandre J. Da Silva, Norman J. Pieniazek, *Asian Freshwater Clams (Corbicula fluminea) and Zebra Mussels (Dreissena polymorpha) as Biological Indicators of Contamination With Human Waterborne Parasites*, Aquatic Invaders, Volume 13, Number 4, Winter, 2002.

Sticky mucous binds both the feces and pseudofeces containing live infectious agents when it is ejected by the bivalve mollusks. This effectively prevents resuspension of waste products. This is useful to the bivalve mollusks in that it prevents re-ingestion by the same or other filter-feeding bivalve mollusks. As more material is ejected and settles to the bottom and is deposited, the organisms contained in the bivalve mollusks' feces and pseudofeces are sequestered in the sediments and removed from the water by direct burial in the sea bed. Benthic deposit feeders such as worms and certain clams may then consume this material a second time destroying more of the organisms.

This sequence of events changes these infectious agents into harmless material.

The processes of sequestration, and burial described above have been documented in fresh, estuarine, and salt water. See Wetzel, Robert G. Limnology, CBS College Publishing, Saunders College Publishing, ISBN 0-030057913-9 767PP.

The system used to conduct the process described above will be described in greater detail below.

Accordingly, it is a first object of the present invention to provide a method for biological control of waterborne infectious agents.

It is a further object of the present invention to provide such an invention wherein bivalve mollusks are employed to disinfect a body of water.

It is a still further object of the present invention to provide a process practiced in moderate to slow moving water.

It is a still further object of the present invention to provide such a process in which waterborne diseases and parasites are transferred to the bottom sediment as a method of control as the process is practiced.

It is a yet a further object of the present invention to provide such an invention in which means are provided to contain bivalve mollusks within a prescribed area, with bivalve mollusks suspended above the bottom.

It is a yet further object of the present invention that it may be practiced in conjunction with bivalve mollusks or other benthic biota planted on or in the bottom to further increase the efficiency of the invention.

These and other objects, aspects and features of the present invention will be better understood from the following detailed description of the preferred embodiments when read in conjunction with the appended drawing figures.

BRIEF DESCRIPTION OF THE DRAWINGS AND PHOTOGRAPHS

SPECIFIC DESCRIPTION OF THE PREFERRED EMBODIMENTS

Figure 1:
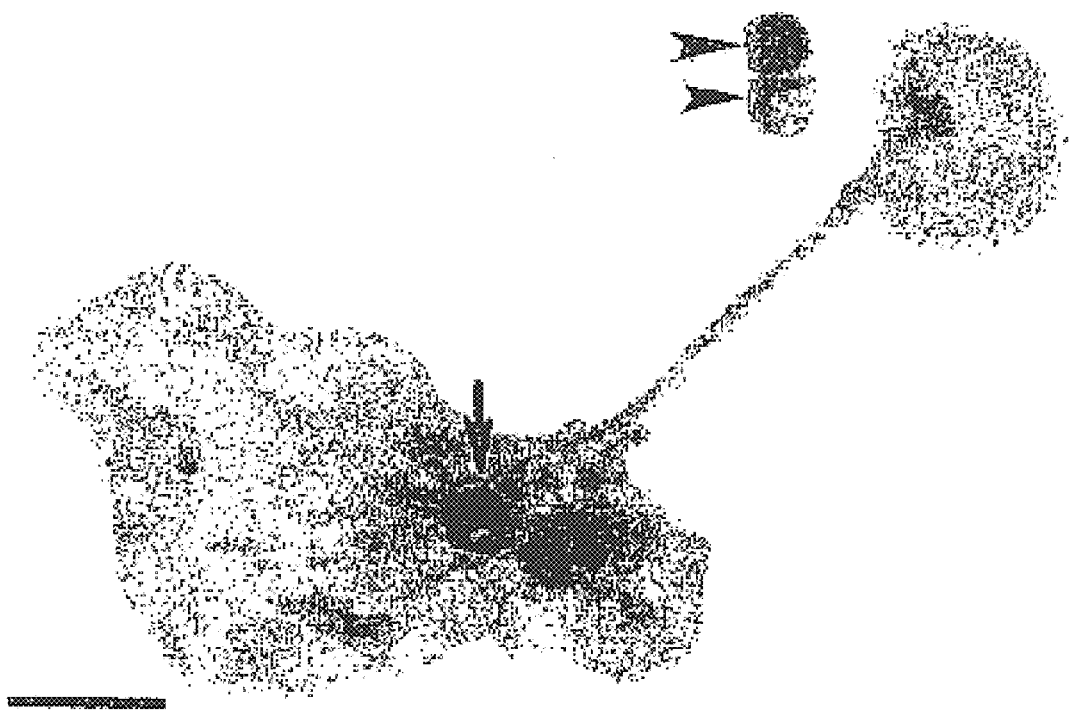
FIG. 1 is a photomicrograph of a clam blood cell having ingested (phagocytosed) a parasite oocyst and chasing down two more.
Figure 2:
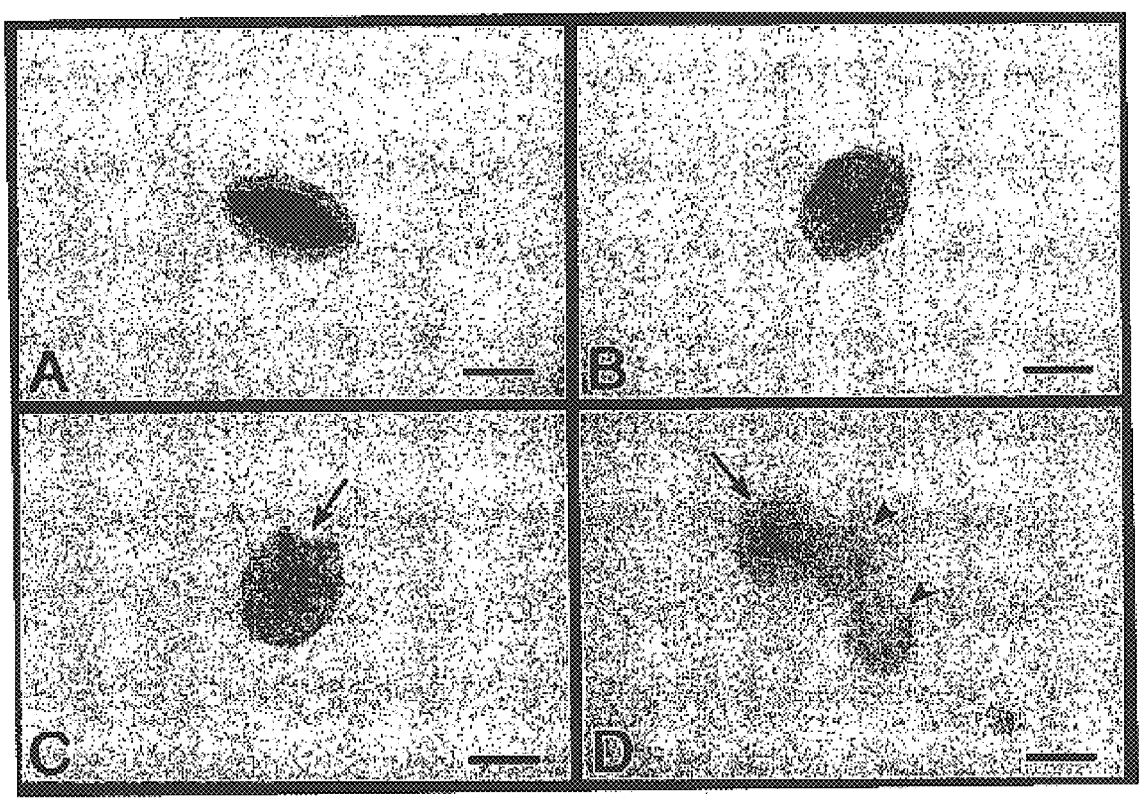
FIG. 2 shows images of damaged (inactivated) parasite oocysts recovered from clam tissue and feces with a viable cyst for comparison.
Figure 3:
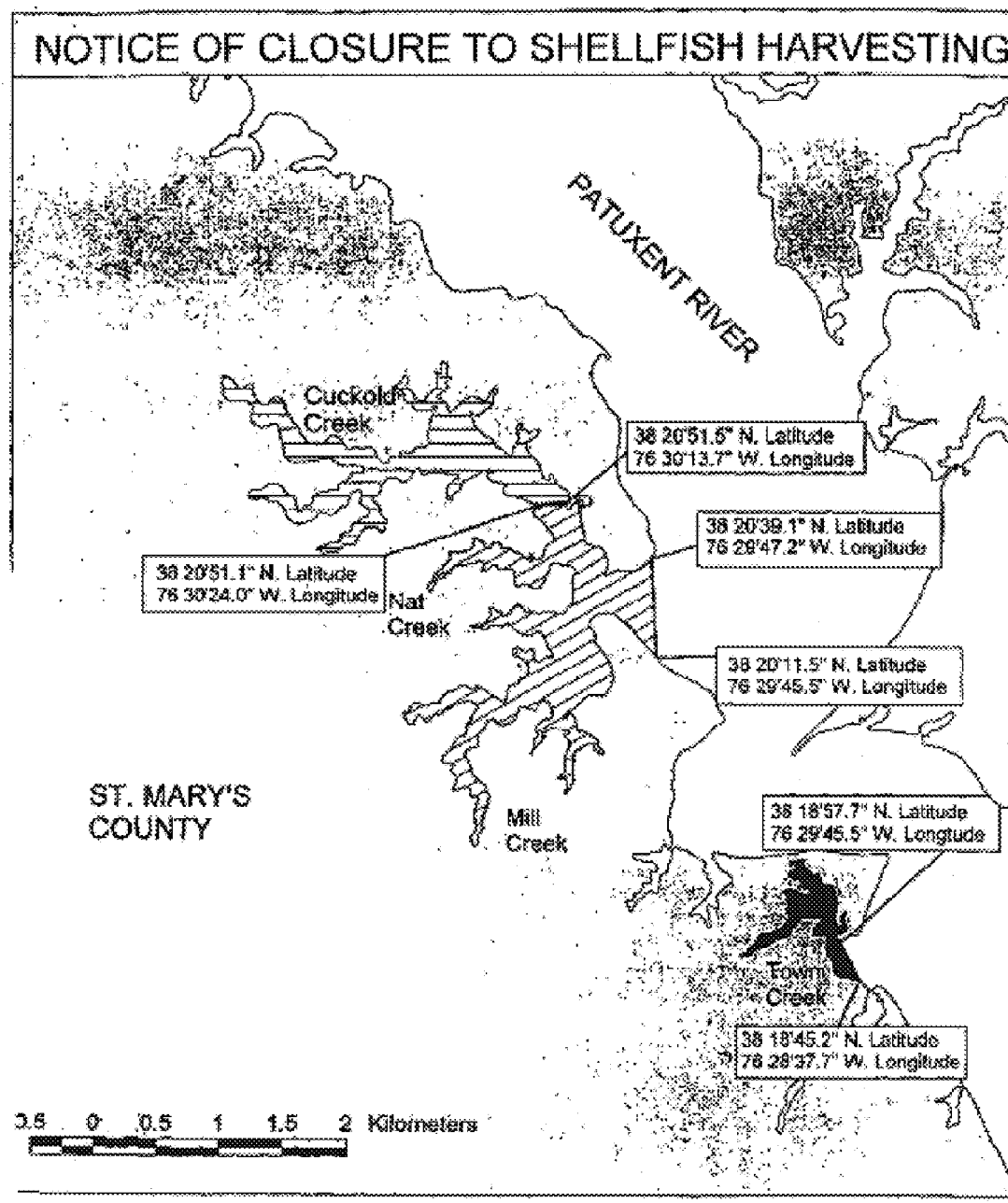
FIG. 3 is a notice of closure to shellfish (refers to bivalve mollusks) harvesting issued by the Maryland Department of the Environment for a section of Cuckold Creek dated October 2002.
Figure 4:
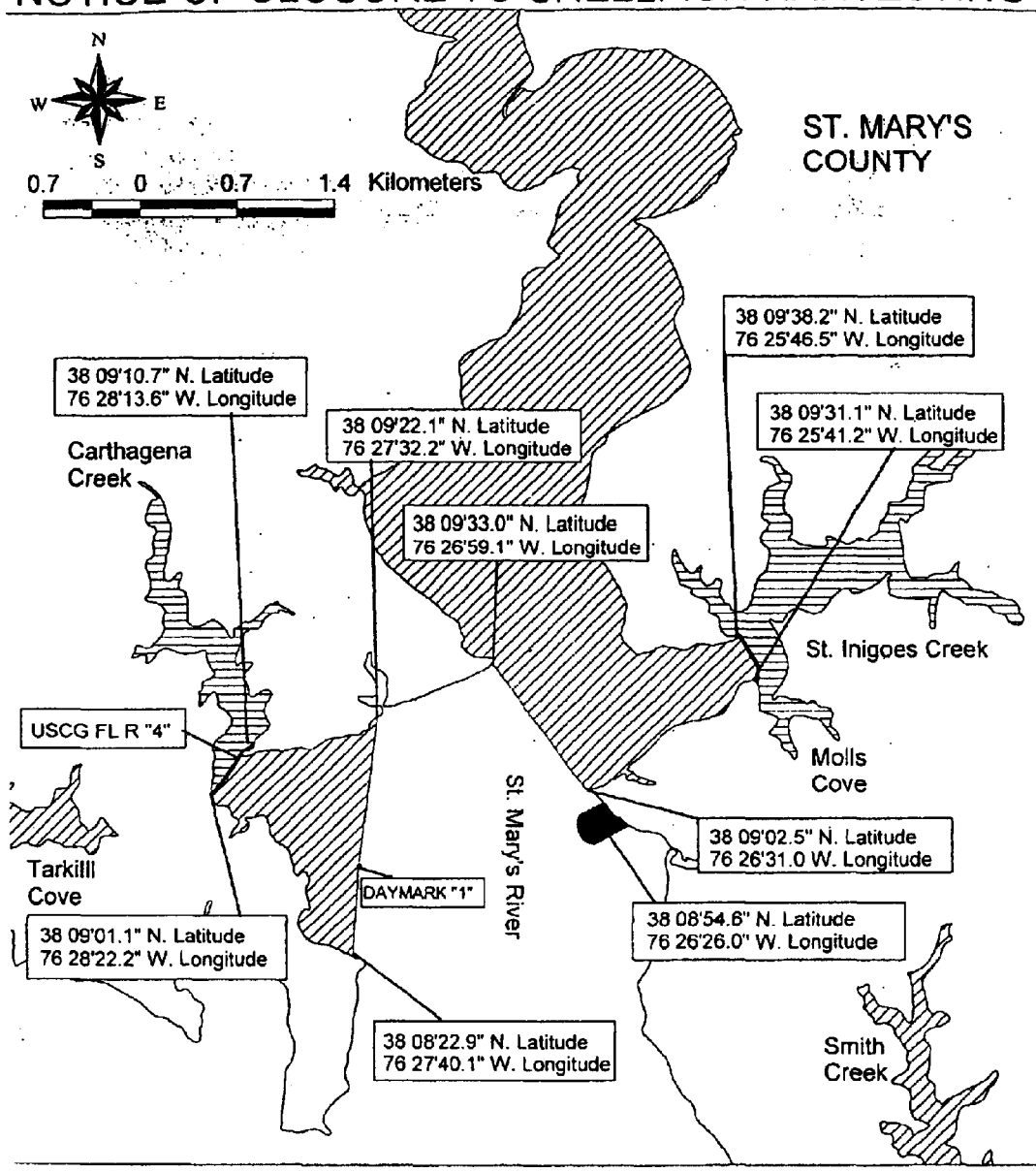
FIG. 4 is a notice of closure to shellfish (refers to bivalve mollusks) harvesting issued by the Maryland Department of the Environment for portions of Carthagena Creek and St. Inigoes Creek also dated October 2002.
Figure 5:
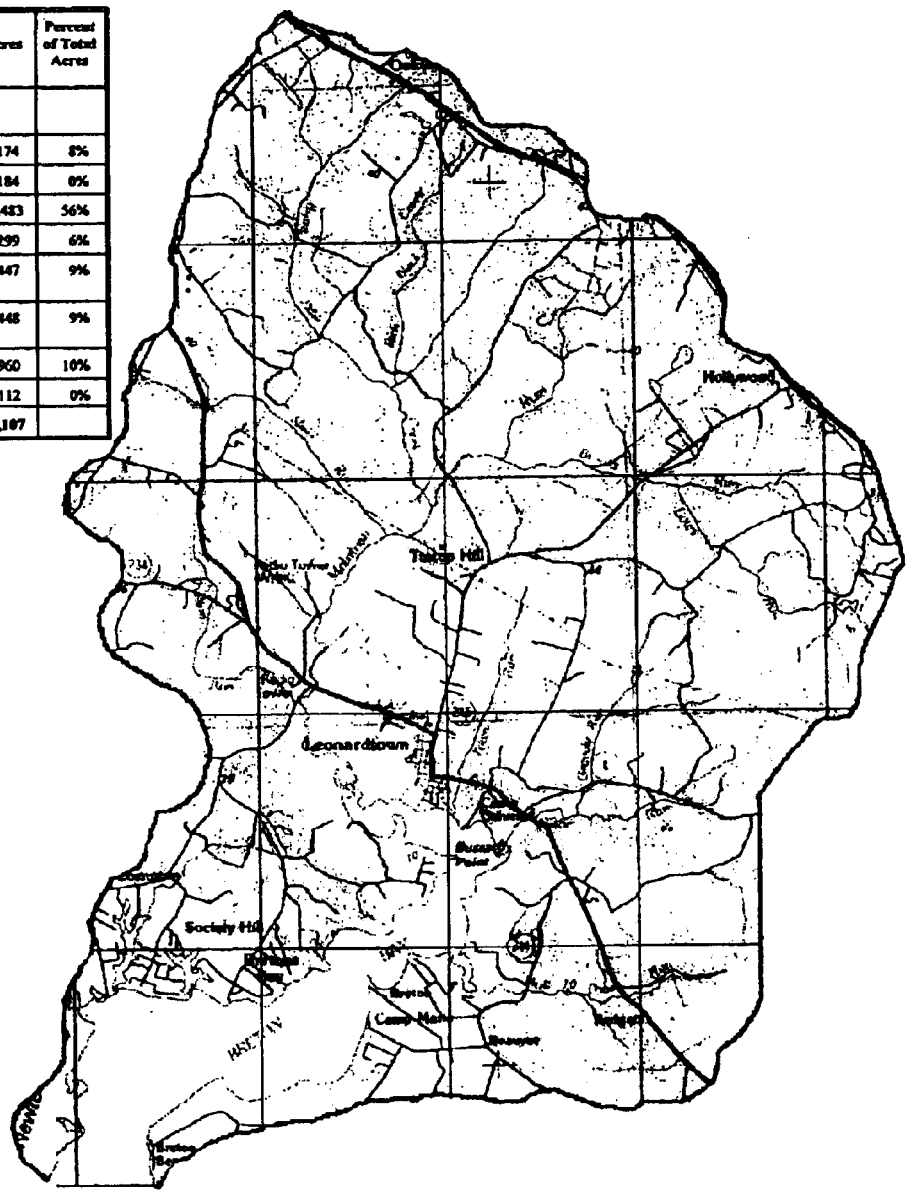
FIG. 5 shows a topographic map of Breton Bay, Md. showing major drainage areas and various parameters that must be taken into account when planning an array.

In practicing the teachings of the present invention, the following steps are preferably undertaken:

(1) Select a body of water to be treated among the following choices: Lake, Pond, Stream, River, Estuary, Ocean Bay or other body of water. Choose a definable finite area such as a pond, reservoir or estuary. This sets the scope of the project. Natural and man-made open water bodies are usually hydraulicly connected and flow into one another. For example, although it may be desirable to control infective agent levels through the entire Mississippi River, it would be easier to do this one region at a time. Selecting a manageable size is important to the success of the inventive process. The project can be too large for one system and may require multiple systems of various types. One example of this would occur in an estuary where salinity varies from one end to the other and different species of mollusk would be required. A second example would be controlling infective agent levels throughout a small bay that has pasture land, a waste water treatment plant and a stream flowing out of a marsh with dense wildlife populations. A body of water can also be too small for the system to continuously operate. For example, one mature oyster of the species *Crassostrea virginica* is capable of filtering 50 gallons of water per day. Sufficient phytoplankton production is necessary to sustain and feed the bivalve mollusks for the system to work. The system needs to be sized according to the amount of water to be treated. In mesotrophic conditions a minimum of 3–4 times the volume of photic (light penetration) zone water is required to maintain a standing population of phytoplankton to feed the mollusks. As such, at least 200 gallons of photic zone water will be required for one mature oyster or 300 gallons for one mature hard clam. For example, these mollusks will not continue to work in a system where food supplies will be exhausted without regular replacement of the filter feeding mollusks.

(2) Evaluate the water body to see if it is suitable for the inventive process.

Suitability criteria:

Waterflow:

This requirement will vary according to the species chosen. Engineered structures and equipment can be used to bring these within the proper parameters. Usually water flow speeds between .2 −>4.0 knots are acceptable.

Water system fertility:

Eutrophic, mesotrophic, oligotrophic.
Level of infectious agent loading (target organisms):

Type of infectious agent
Size of agent
Ability to support life of:

Phytoplankton
Mollusks
Climate:

Ice and snow cover may reduce the depth of the photic zone. Seasonal variations in temperature coupled with the requirements of the mollusks that make the system seasonally effective.

(3) Select the location for the inventive system within the body of water. The position of the system to be treated is the most important choice that needs to be made. Water flow carries the waterborne target organisms and life supporting phytoplankton (mollusk food) to the intercept array. The bivalve mollusks held in the array will consume or remove significant numbers of the waterborne infectious agents, as well as, algae and other particulate matter from the water. The water will continue to flow on through the intercept array carrying with it the pseudofeces and feces produced by the bivalve mollusks. The waste stream coming from the bivalve mollusks settles out of the current in the deposition area. This deposition area is called the "plume".

(a) First, locate and survey the threat area where a maximum of the waterborne diseases and parasites are expected to come. An example is an incoming stream from an area heavily populated by animals. Then determine the areas of maximum phytoplankton production. These may be found adjacent to areas of upwelling. Mortimer, C. H. (1971): Oscillatory Motions and Seasonal Temperature Changes in Lake Michigan and Lake Ontario. Special Report No. 12, Center for Great Lakes Studies, University of Wisconsin-Milwaukee, Part I Text, 111 pp. and Part II Illustrations, 106 pp, is very useful in understanding and locating these areas. These areas include stretches along the lee shore, downstream from the plunge point in a reservoir or estuary, and they can be engineered into the system. To create a plunge point in a stream or river, one only needs to build a dam or weir.

(b) Second, because a food supply for the mollusks is critical, one needs to survey the size of the phytoplankton production area. This area will be determined by water residency time ($T_W$). $T_W$ will be 3 to 4 days to allow the algae population to double in mesotrophic conditions. A $T_W$ of less than 3 days can result in overgrazing if the array has an efficiency of 50% or greater and the water goes through the array multiple times as in tidal areas. However, in tidal areas one can take advantage of this feature by having the algal production area on one side and the threat area on the other.

Stratification is an important consideration when locating the area of maximum phytoplankton production. Stratification occurs in most bodies of water due to differences in water density caused by temperature and/or salinity variances. Under eutrophic conditions, once stratification takes place, oxygen is quickly depleted from the water in the hypolimnion (the densest layer of water on the bottom) by biological processes. Bacteria populations consume excessive quantities of organic material, and this is the primary reason for the loss of oxygen. At this point, anaerobic respiration dominates the water/sediment interface. This is an example of when the present inventive system would be more successful if coupled with Applicant's Biological Nutrient Control System disclosed in U.S. Pat. No. 6,391,201 in order to alleviate the problem or eutrophication. Anoxic conditions in the water above the sediment are not conducive to properly populating the plume area or the deeper part of an array. In addition, under these conditions, large quantities of phosphorus can be released from the sediments into the water column when the water sediment interface is anaerobic. When mixing occurs between the stratified layers for any reason, this phosphorus fertilizer immediately becomes available for plant growth in the upper layer. The obvious examples of how this mixing can occur are wind, wave, and tide. A steady wind blowing across a body of water in one direction pushes the surface water along with it. Water from below rises near the leeward shore to replace the warmer water that has been blown away. This upwelling brings with it large amounts of nutrients which become available for plant growth and cause extensive phytoplankton blooms in eutrophic waters.

Mixing of the upper and lower layers of stratified water also occurs in reservoirs where incoming water from a stream is colder than that of the impoundment. The location of this occurrence is called the plunge point. At the plunge point, incoming surface waters dive below the surface water of the reservoir displacing water near the bottom and forcing it upward. Knowing the location of the plunge point and zones of upwelling is important in determining the location of the zone of maximum phytoplankton production. A thermometer is used to locate the plunge point because it is marked by a distinct rise in surface water temperature on the downstream side. Downstream from this point is a zone of mixing where primary production increases. The plunge point migrates up and down the reservoir with changes in incoming flow. Applicant has found that the best placement for scavenger arrays is usually near the downstream end of the mixing zone, while safety zone arrays are placed upstream of the plunge point in order to catch the infectious agents before they are dispersed.

(c) Third, if the body of water to be treated is an estuary, which is where most of the bivalve mollusks in the United States are grown, areas are chosen where tidal flow is moderate. Strong flows will sweep the waterborne target organisms to be removed through the array before they can be processed. Low flows may not provide the bivalve mollusks enough food to support growth and will decrease removal rates. The best spread of the scavenger array for removal of the target organisms is ⅔rd upstream and ⅓rd downstream from the entry point of the infectious agents. See Coon, S. L.; Bonar, D.; Weiner, R. M., TECH. REP. MD. UNIV. SEA GRANT PROGRAM. *THE FATE AND EFFECTS OF POLLUTANTS: A SYMPOSIUM,* 1985, p.58, REPORT NO.: UM-SG-TS-85-02.

Mixing of stratified layers can also occur when surface waters become denser than the underlying water. This can happen in the fall and spring, especially in fresh water lakes. This turnover usually occurs in conjunction with a cold rain that cools surface water. This phenomenon will affect an entire lake or pond. Care must be taken to avoid these events when attempting to locate upwelling areas or the plunge point. In the British Isles, for example, this event can happen in fresh water ponds throughout the winter, so identification of plunge points and areas of upwelling must be done in the other seasons.

(4) The plume area is next located. This is the area of deposition and secondary processing or burial by benthic macro organisms. In an estuary, the plume of bivalve mollusk droppings can be expected to be two-thirds upstream and one-third downstream. The selection of this area will vary according to the current conditions and the desired outcome, for example, if the current condition is contaminated and needs disinfecting or if the current condition is safe water and the system is being put in place to reduce contamination of a larger area in the case of an accident (such as a safety zone put in place around a waste water treatment plant). When the system is to be deployed in conjunction with a system as disclosed in Applicant's prior U.S. Pat. No. 6,391,201, or is a dual use Biological Nutrient Control (BNC) system, and waterborne Infectious Agent Control System, there may be two separate plume areas or the plume area may be temporal in nature. In such events, it is necessary to have an oxygenated micro-zone to control eutrophic conditions and support conditions for benthic deposit feeders desirable for secondary processing and destruction of the target organisms. The target depth of the photic zone will extend into the hypolimnion. Any permanent plume area should be deeper than the targeted depth of the photic zone to prevent Submerged Aquatic Vegetation (SAV) establishment. If SAV is rooted in the plume area, it will lower the effectiveness of the inventive system. This is because the SAV would block sedimentation of pseudofeces and feces bearing viable infectious material. Decay of this material above the sediment would result in the release of active infectious agents back into the water column. The plume size and shape can be calculated using the same methods described in the prior invention mentioned above; to wit, using the water speed, settling rate of the waste produced by the bivalve mollusks, and the distance it needs to fall to reach the bottom in the plume area to perform such calculations. The plume should be located in an area likely to remain undisturbed in the hypolimnion. This is important so that buried pseudofeces and feces bearing viable infectious material are less likely to be resuspended.

Eutrophic conditions are not favorable to the success of the inventive system for reasons enumerated above. In the cases where this condition exists, removing the dense volume of phytoplankton from the surface will be the first step. Implementing the system and method disclosed in Applicant's prior U.S. Pat. No. 6,391,201 is suggested as a means of eliminating eutrophic conditions.

Because the photic zone is compressed and submerged aquatic vegetation (SAV) is not initially a problem in eutrophic water, shallow areas adjacent the shoreline can be used.

The area(s) for the temporary-plume(s) are chosen where SAV beds are needed to buffer the shoreline from wave erosion whenever possible. The material deposited in the plume area will initially slow the emergence of SAV. Later, it will serve as fertilizer for the new plants for stronger, healthier growth. The establishment of these SAV beds is important because they will reduce sediment loading. Excess sediment in the water reduces the effectiveness of the intercept array to control the infectious agents, so building SAV shore buffers will make the permanent array, established elsewhere, more efficient.

Mollusks receiving excess sediment loads sometimes quit filtering until the event passes. Once the system becomes mesotrophic, SAV can be expected to re-establish itself in shallow areas where sunlight again can reach the bottom.

SAV beds can alter water flow patterns and engineering plans should take expected changes in size and location into account. Phytoplankton production is poor near or in the limnetic zone (the near-shore zone where rooted SAV occurs), so it will affect the phytoplankton production area. SAV located in shallow water can dramatically slow currents where they become established. Because water will seek the easiest route, and will accordingly divert around these beds. This will alter engineering plans in a number of ways. When flows are constricted, water speeds can be predicted to increase. SAV beds will also produce a shadow effect. This is an area where calmer, slower moving water containing less food can be found. Proper engineering of SAV bed locations can greatly enhance the effectiveness of the present invention.

(5) Determine the type of array needed for the desired outcome.

(a) If the desired outcome is to remove as many infective agents as possible, choose a sanitation array. Keep in mind that overgrazing will occur. Several controls must be used to ensure that the bivalves have enough food to survive even though growth rates may be significantly reduced. The first control of significance is the bivalve mollusk biomass, the second is the spread of the intercept array, and the third is continuous replacement of bivalve mollusk with fresh animals having built up internal food reserves. In this case, where sanitation is desired, bivalve mollusk shadow effect should be taken full advantage of in order to maximize removal rates. In this regard, bivalve mollusks are placed so that they re-filter water that has come from other bivalve mollusks upstream of them producing the same effect as an SAV bed.

(b) If the desired outcome is to lower existing pathogen numbers to below infectious rates and stabilize conditions, choose a reduction and control array. Arrays should be placed in areas that intercept the bulk of infectious agents when they first enter the controlled area. They should be designed so that they can control infective agents at the expected range of flows from the contamination source. The volume of water to be treated is key to calculating the bivalve mollusks biomass needed. The designer must keep in mind that the bivalve mollusks need an abundant source of other food when placing the array.

(c) If the desired outcome is to establish a safety zone around a potential hazard and to prevent the release of pathogens into other areas at infectious rates, choose a safety zone array. Stable array conditions must be maintained with a healthy viable bivalve mollusk population of sufficient biomass to handle predicted accidental releases. This requires an abundant source of other food for the mollusks.

(d) If the desired outcome is to augment another array without changing it, a scavenger array is chosen. Scavenger arrays should also be placed around the controlled area in order to remove infectious agents that were present prior to emplacement of the other array and to further reduce numbers that may get past the initial intercept arrays from time to time such as after a heavy rainfall causing greater than usual amounts of material to enter the water. The proper placement and sizing of scavenger arrays will take into account the removal of infectious agents that are directly deposited in the controlled area by wildlife or other sources.

In all cases care should be taken to choose the array sites so that the plume area will develop in areas that the feces and pseudofeces fall on soil instead of hard material or SAV and where oxygen levels are such that benthic deposit feeders can be introduced or encouraged to colonize the area. This will increase the efficiency of the current invention by providing for a second point where ingestion and digestion of infectious material can take place and where burial and sequestration are enhanced through bioturbation.

Under eutrophic conditions it is suggested that the current invention be coupled with use of the aforementioned BNC™ system in order to bring water quality to mesotrophic conditions. This will enhance bottom conditions; such as oxygen levels and food supply, for infauna-deposit-feeders.

Moving water is required to bring the target organisms as well as other food to the bivalves. All arrays are placed so that the waste stream of the mollusks within the array will fall directly onto the bottom within the designated plume area. Water flow throughout the array site must be sufficient to move target organisms and other food past the bivalve mollusks. If the water velocity is too high, the bivalve mollusks will not have sufficient time to efficiently remove the target organisms. If it is too slow, the first part of the array will produce growth in the bivalve mollusks and the rest may starve. Water flow control structures may be provided to correct these deficiencies. However, this will add cost to the inventive system that may be avoided through site selection. The array is sized according to the water to be treated for target organisms to be removed, the filtration rate of the bivalve mollusks, and the capacity of the aquaculture equipment within the array.

The best array site to control waterborne diseases and parasites lies in an appropriately configured array in relatively shallow water. Correctly designed arrays will allow filtration of the entire water column. The present invention is designed to reduce the numbers of target organisms and shallow water is easier to clear. Shallow water also heats more readily allowing faster processing of materials on the bottom and is less likely to stratify. Vertical mixing occurs more readily in shallow water, breaking stratification when it occurs, maintaining good oxygen levels throughout the water column. Keeping a constant supply of oxygen to the benthic biota is imperative. To accomplish this in deeper stratified water the photic zone must extend through the epilimnion into the hypolimnion.

If the array was to be placed in deeper stratified water the pseudofeces and feces might build up causing anoxic conditions at the sediment interface. Poor success could then be expected when trying to establish colonies of benthic deposit feeders reducing the efficiency of the current invention.

The array should hold the mollusks throughout the water column so that infectious material found at all depths can be processed by the mollusks.

(6) Determination of the species of mollusk best suited to the conditions is the next step. In most situations, native, pseudofeces producing mollusks are chosen which also have after harvest value.

Applicant has found that native species will produce higher success rates, especially ones that historically grew in the waters where the system is to be deployed. Historical production levels are an excellent way to determine (1) what specie was originally in an area, and (2) system carrying capacity. With local species, the animal's environmental requirements are much easier to meet. Non-native introductions are likely to exhibit a boom/bust population cycle which is hard to control. For success, it is necessary for the system manager to remain in control of biomass which is directly related to filtration capacity. Choosing a native species eliminates many management problems and in many areas regulatory hurdles. Choosing a native species will often improve the survival rate of the selected mollusk to harvest size. Native species usually have an established locally available market which can significantly reduce overhead cost. The next best choice is a naturalized non-native species which is well established and has not shown deleterious environmental effects.

In most cases, it is preferable to choose a bivalve mollusk that is capable of pseudofeces production. Choosing pseudofeces producing bivalves will increase filtration substantially. Pseudofeces producing bivalve mollusks not only remove the particles they ingest for food but they also remove other particles from the water column and deposit them on the bottom for processing by deposit feeders. The filter-feeding mollusks in the array remove particulate matter which interferes with light transmission into the hypolimnion, enhancing oxygen levels due to photosynthesis. This increase in oxygen levels is important to maintaining populations of deposit feeders and infauna that are responsible for bioturbation, and important in the process of burial and entombment of infectious agents.

Preferably, a species with post harvest value is also chosen, for example, shell, meat, pearls, environmental restoration efforts, etc. This is important, otherwise a disposal issue must be confronted. In these systems, where meat for human consumption is the desired post harvest product, and human pathogens or parasites are the target species, health standards must be strictly adhered to and methods used to cleanse the bivalve mollusks whenever necessary must be followed to the letter. Fortunately many methods for relaying, natural purging and depuration are all well developed safe methods for the cleansing of these animals. Of specific note is isostatic or hydraulic processing which is known to kill parasites, yeast, mold, pathogenic bacteria, non-pathogenic bacteria viruses and spores. The recent discovery and perfection of techniques to identify infectious agents within bivalve mollusks are critical in this process. The harvesting of animals is done in order to keep the filter feeder biomass from outstripping its food supply. Calculation should include target organisms as part of the food supply. Harvesting gives the operator of the system valuable feedback on the condition of the animals held in the arrays which is very important information necessary to keeping the system functioning at its best. Mollusks that are allowed to die in situ have no value to the system and must be replaced.

Likely bivalve mollusk candidates are oysters, clams, and mussels. In order to get a feel for the good choices, specific candidates for consideration are given in the following list for the Eastern United States showing probable post harvest usage. Salinity is one major consideration.

Salt water species:

| |
|---|
| i) Blue mussel *Mytilus edulis* meat |
| ii) Hard clam *Mercenaria mercenaria* meat |
| iii) Scallops *Pectiniae sp.* meat |

Estuarine Species:

| |
|---|
| i) Oyster *Crassostrea virginica* treat |
| ii) Softshell clam *Mya arenaria* meat |

Fresh water Species:

| |
|---|
| i) Fresh water mussels *Anodonta sp.* (Pearls and shells) |
| ii) Wedge Rangia *Rangia cuneata* (Populating other arrays) |
| iii) Fresh water clams *Corbicula fluminea* (naturalized non-native) meat |

The following lists are helpful in choosing an appropriate mollusk for the Chesapeake Bay which currently has many areas closed to harvesting of bivalve mollusks due to elevated pathogen/parasite risk.

Native and pseudofeces producing:

| | |
|---|---|
| *Crassostrea virginica* | Eastern oyster |
| *Geukensia Demissa* | Atlantic ribbed mussel |
| *Ischadium recurvum* | Hooked mussel |
| *Petricola pholadiformis* | False angel wing |
| *Cytropleura costata* | Angel wing |
| *Mya arenaria* | Soft shell clam |
| *Tagelus plebius* | Stout razor clam |

Harvest value in descending order:

| | |
|---|---|
| *Crassostrea virginica* | Eastern oyster |
| *Mya arenaria* | Soft shell clam |
| *Tagelus plebius* | Stout razor clam |
| *Cytropleura costata* | Angel wing |

Preferably, a species is chosen such that the site where the invention is practiced is in the middle of the environmental range of the species. This will maximize tolerance to various environmental factors (salinity, temperature) which can be a limiting factor needing close attention when choosing a mollusk species. A site that is located near the boundary of one of these limits will regularly experience periods of time when the limit is exceeded. One example of a poor choice for the Chesapeake Bay would be *Mya arenaria*. Although it is found in large numbers in the Chesapeake Bay, it is at the Southernmost extent of its range and is subject to massive die-offs during warm weather where summer temperatures regularly exceed its survival limits. At more northerly latitudes, it would be a good candidate. Such a drastic loss of the animals could result in failure of the system possibly causing epizootic/enzootic or plant blight conditions to occur.

(7) Next choose the deposit feeders. This is only necessary in certain cases such as:
   i. where these animals are in low numbers or non-existent due to eutrophic conditions or some other reason;
   ii. when natural recruitment fails;
   iii. when the system must be started up quickly;
   iv. for augmentation of naturally occurring colonizers.

As stated earlier, these animals will not be harvested due to the negative effect that would have on the inventive system. Therefore post harvest value is not a concern. Native burrowing species that will consume and/or bury live infective agents are chosen for their ability to turn over large quantities of bottom soil and for their ability to digest and destroy the infective agents. More research is needed to identify members of the deposit feeding worms with the same ability as filter feeding mollusks. All deposit feeders consume organic material found in or on the bottom, digesting the bacteria found with it, so it is known that they can at least destroy this type of pathogen. Because of their ability to target this small prey size it is very likely they have developed the ability to digest and draw energy from the other various infectious agents targeted by this invention. Knowledge about these animals ability to produce bioturbation is well established and establishment of them in the plume area soil is beneficial.

Below is a list of candidates beneficial in the plume area for their ability to produce bioturbation and, in the case of the mollusks to digest the target organisms. The animals listed are known to be adapted to the soil conditions and types found in a plume area and inhabit the Chesapeake Bay region.

| | Mollusks |
|---|---|
| Fresh water | *Rangia cuneata* (Wedge Rangia) |
| | *Corbicula fluminea* (Prosperity clam) |
| Estuarine | *Ensis directus* (common jackknife) |
| | *Tagelus plebeius* (stout razor clam) |
| | *Macoma balthica* (Baltic macoma clam) |
| Ocean | *Anadara ovalis* (blood ark) |
| | *Anadara transversa* (transverse ark) |
| | *Noetia ponderosa* (ponderous ark) |
| | *Tagelus divisus* (purplish razor clam) |

Burrowing worms of any significance are only found in estuarine to ocean salinities.
   *Pectinaria gouldii* (trumpet worm)
     (selective deposit feeder)
   *Arenicola cristata* (lug worm)
     (non-selective deposit feeder)
   *Asychis elongata* (elongated bamboo worm)
     (non-selective deposit feeder)
   *Clymenella torquata* (common bamboo worm)
     (non-selective deposit feeder)
   *Arabella iricolor* (opal worm)
     (produces dense populations)
   *Nereis succinea* (clam worm)
     (detritus feeder)
   *Amphitrite ornata* (ornate worm)
     (selective deposit feeder)

(8) Next, the intercept array is appropriately sized. Safety zone, reduction and control, scavenger, and sanitation arrays are different in size and shape. In addition, filtering rates of the chosen mollusk are an important consideration. One 3" oyster of species *C. virginica* can filter 50–55 gallons of water per day while an adult *Mercenaria mercenaria* can filter 72 gallons per day.

In combination with the attached figures and preceding information, the following will allow those skilled in the art to properly design each of the listed arrays so that they can be used in the present invention.

Four types of intercept arrays are discussed below. They are:

1. The safety zone array;
2. The reduction and control array;
3. Scavenger arrays;
4. Sanitation arrays.

The present invention can be used as a safety zone. The safety zone array is a form of intercept array that should be designed to surround the source area of a potential contamination spill. It should be well enough populated with mollusks to consume the pathogens and parasites likely to be contained in a spill yet the mollusks must be able to live on the available food supply in non-spill conditions.

The reduction and control array (another form of intercept array) of the current invention is used to reduce and control existing contamination of open water areas by infectious agents. It is set up to intercept the target organisms and is placed between the source of these organisms and the area to be protected, such as a swimming area. As control is established, the intercept array must be modified to fit this situation and other changing conditions. This is especially true when the current inventive system is combined with a BNC™ system in accordance with Applicant's prior U.S. Pat. No. 6,391,201.

Both types of intercept arrays mentioned above will be shallower and contain more bivalve mollusks over a broader footprint than scavenger or sanitation arrays. This is because they need to be as close to the source as possible to reduce the effect of dilution. Changing water conditions and nutritional levels will require that the array mentioned above be continually monitored and modified to meet these and other changes as they occur. In permanent pathogen reduction systems where the source is not likely to go away, (such as wildlife populations in areas where they are protected) fewer modifications can be expected to be required over time.

Scavenger arrays are small, somewhat mobile, dispersed arrays set up to further reduce existing numbers of pathogens that can be expected to get by the safety zone array and the reduction and control array, or come from mobile dispersed sources such as fish and other aquatic animals and waterfowl.

Sanitation arrays are used in conjunction with the various intercept arrays mentioned above and placed to protect the intake area for a water supply, be it for irrigation, potable water or some other use requiring strong control measures. These are tight, compact systems through which all the water is drawn and are set up with multiple bivalve mollusk shadowing events so that the water is filtered multiple times before reaching the intake. These arrays will need to have the bivalve mollusks found in the "shadow" replaced regularly because they will be receiving very little food and will deplete their stored energy reserves. In some cases the frequency of replacement of the shadowed bivalve mollusks can be reduced by rotation of floats from the back of the array to the front. Reduced function of these systems due to bivalve mollusk mortality or any other reason increase the risk factor, requiring very close monitoring of the systems. Bivalves which can attach to the inside of pipes such as mussels with byssal threads or oysters and mollusks that have mobile planktonic juvenile or larval stages may not be suitable for certain of these systems.

(9) Last, go over this check list for planning the array. In planning any array, the following data is required:

| | |
|---|---|
| I. | Reason for the need for infectious agent control and results desired; |
| II. | Source and type of infectious agent, i.e. man wildlife, domestic animals, plants or decaying vegetation; |
| III. | Residency time of the algae production area; |
| IV. | Flow rates through the system:<br>  I.  Initial;<br>  II.  Projected; |
| V. | Filtration capability of chosen mollusk species and size of the target organisms; |
| VI. | Depths of water throughout the system; |
| VII. | Depth of photic zone: initially and projected; |
| VIII. | Stratification that can be expected; |
| IX. | Upwelling areas; |
| X. | Projected littoral zones (areas where the planned depth of the photic zone exceeds the water depth). |

Parameters to be taken into account:

| | |
|---|---|
| I. | Flow rate, food load (including target organisms), and filtering capacity of mollusk biomass; |
| II. | Current contamination or safety zone; |
| III. | Location and type of contamination source or risk area, i.e. sloping pasture, periodic grazing, waste water treatment facility overflow hazard, storm water runoff, wildlife refuge; |
| IV. | Upstream Residency time for algae: 3 days is required to maintain population equilibrium; |
| V. | Phytoplankton biomass will equal 3 days filtration rate of mollusks when system is balanced for mesotrophic conditions; |
| VI. | in eutrophied large water bodies, downstream mixing of cleared water is where the oxygenated micro-zone is expected to end and the plume must be well within this area. |

If 50% of the particulates in the photic zone are removed, the photic zone depth will approximately double since light attenuation by water in shallow depths is usually insignificant. Bog water containing high amounts of humic acid is one exception to this general rule. If the photic zone depth exceeds the depth of stratification, eutrophic conditions will have been eliminated. Once eliminated, the effective oxygenation depth will exceed actual depth with a reasonable safety factor. This is important for reasons listed above. Rates of deposition for target organisms depend on filtration capacity of the bivalves, percentage of those digested, intercept cross section, volume of water flow, and volume of suspended sediments. Actual target organism removal will need to be determined from samples taken and tested and will vary from site to site. All adjustments to the system must be made with the goal of bring target organism levels within desired control parameters.

Carrying capacity for intercept arrays must be calculated so that it is not exceeded. For sanitation arrays, the carrying capacity will always be exceeded, and for scavenger arrays, because of their size and dispersal, this should never be a problem. The carrying capacity is determined by Liebig's rule that there is a limiting environmental factor which inhibits growth of a population (algae, infectious agent load, etc.) beyond a certain point. When considering bivalve numbers, food supply is a limiting factor. Therefore, consideration must be taken of the food requirements and limiting factors thereof. For algae in freshwater systems, the limiting factor is usually phosphorus and for saltwater it is usually nitrogen. For bivalve mollusks, algae, food supply, and oxygen are critical limiting factors. For benthic biota, a continuous supply of digestible detritus and oxygen are necessary.

The bivalve mollusk production equipment selected for the various intercept arrays must fit the biological and environmental requirements of the species selected.

The present invention does contemplate placement of bivalve mollusks on or in the bottom. Benthic, non-reef-forming-filter-feeding bivalve mollusks may enhance the effectiveness of the present invention by increasing filtration of the entire water column. Benthic bivalve mollusks (especially burrowing species) are a permanent feature of the inventive system. The most important consideration is that they not be harvested because the process of harvesting would resuspend infectious agents. Due to the impact on sedimented infectious agents direct planting on or in the bottom of various benthic organisms capable of bioturbation including certain deposit feeding bivalve mollusks is strongly advised for the present invention.

Bivalve mollusk production equipment selection is both species and site specific and is best left up to the operator. Culture methods for various bivalves vary according to their environmental and physiological requirements. For example, soft shell clams Mya arenaria require support from sediment around their shells while species such as *Mytilus edulis, Corbicula fluminea* and *Crassostrea virginica* can be suspended in open water. Numerous types and variations of bivalve mollusk growing equipment suitable for use in this system are known. Care must be taken to select equipment suitable for the location and the species chosen. Off-bottom systems are best suited to the system so that harvesting and cultivation activities do not re-suspend infectious agents. It must be strongly emphasized that benthic organisms once planted not be harvested and that they are highly recommended for the present invention.

Circle C Oyster Ranchers Association Inc. employs Applicant's floating oyster reef as an excellent choice for the production of oysters in protected shallow estuarine waters. Sock culture of *Mytilus edulis* using long lines in coastal waters is an excellent method for this species. Floating sand boxes are an excellent choice for certain clams. When choosing a system, it is best to find one that has been successful in the area for the species to be cultured. Switching either the species or locations for these culture systems would potentially result in failure.

Because sites are quite variable, small scale testing is important to determine viability. The present system is a complex biological system that requires strict adherence to maintaining the biological requirements of phytoplankton, bivalve mollusks and, in certain cases benthic biota. These three populations must be kept in balance for the current inventive system to work in accordance with the teachings of the present invention. Control of the system is exercised and maintained through regulation of the bivalve mollusk biomass in the intercept array. Grazing and filtration by the bivalve mollusks will control the infectious agent populations. Food supply and oxygen available to the benthic biota established in the plume will also depend on the bivalve mollusks in the array. The feces and pseudofeces generated by the bivalve mollusks will provide the food source for benthic deposit feeders while increased water clarity, which automatically comes with any form of bivalve production, will allow photosynthetic production of oxygen at depth. These populations will adjust according to oxygen levels and food supply.

Array management and reconfiguration is required when conditions change.

Phytoplankton (primary production) removal is monitored using a secchi disk or a light meter. The water entering the array is checked and rechecked downstream and can be used to indicate the effectiveness of the filtration. However, actual testing of water and bivalves for the presence of the target organisms is imperative. If removal effectiveness is too low, and no second source is evident, more bivalve mollusks should be added to the array as a first choice. Addition of a scavenger array downstream may also solve the problem. If removal rates are adequate but food removal is too high, some of the bivalve mollusks are harvested or replaced. Adjustments should only be made according to actual results of testing for target organism. Testing should occur on a regular basis to assure that no target organisms have escaped. Testing should increase following any change in the filtering capacity of the system. In the case of safety zone arrays, use of "indicators" such as secchi depth must be used instead of target organism populations due to the fact that these organisms should not be problematic except in spill conditions.

Harvesting is an array management tool: In tropical situations where there is no specific growing season, a period of time equal to that of the production cycle is used. If it takes 9 months to take a group of animals from the specific size when they are introduced into the array until harvest begins, then a 9 month average is used to calculate necessary adjustments in bivalve biomass. As larger animals are harvested, they are replaced with younger smaller animals. This will keep biomass and therefore filtration rates constant. If overgrazing occurs, starvation of the bivalve mollusks occurs and their effectiveness at removing the target organisms will be reduced. This will allow escape of infectious agents downstream. Resizing the inventive system to provide adequate food for the bivalve mollusks is a simple mathematical problem. If the system is removing 10% more phytoplankton than it should, the filtration capacity of the intercept array is decreased by 10%, in order to maintain reproductive capacity of the algae (a situation known as overgrazing).

Resizing or relocation of the array may be necessary to deal with changing environmental conditions such as the emergence of SAV beds. This must be done carefully once desired clearance rates have been reached and is a somewhat more complex process. This is especially true when the system is a dual use system being used in conjunction with the invention disclosed in Applicant's prior U.S. Pat. No. 6,391,201. The depth of the photic zone will change. Phytoplankton numbers will have changed and will be spread throughout the resized photic zone. Therefore, the array will need to be modified and the bivalve mollusk density will need to change in order for each animal to receive sufficient food. Many species of phytoplankton move vertically on a diurnal schedule. Zooplankton move down during the day to avoid predation by visually hunting predators such as fish. They move up to graze on phytoplankton at night. In response to this movement of zooplankton, phytoplankton rise toward the surface to take advantage of the sunlight and move down at night in order to avoid predation by zooplankton. When calculating the availability of food at depth for the bivalve mollusks in the array it is best to test the full extent of this diurnal transit. Testing vertical distribution is also critical in removal of infectious agents. The visual surface footprint of the array will change to fit the new circumstances. If the system was designed with an initial temporary array in shallow water and the establishment of SAV in littoral areas occurs, these sections must be moved so that the plume area does not include SAV. Extreme care should be taken in downsizing or translocation so that conditions that would permit the survival of infectious agents in the water column are not re-established. Removal should be done in slow stages preferably over several years while the permanent array is being reconfigured to the new parameters. This will also allow for establishment of permanent benthic populations (as described above) in the new plume footprint that will result from array configuration changes. When downsizing any array it is advisable to employ additional scavenger arrays to increase the safety factor.

In large bodies of water, multiple arrays may be necessary to control multiple sources and types of infectious agents. The upstream array is designed and deployed first. This will eliminate guesswork and errors inherent in predicting what will happen downstream because there are numerous variables and unknowns. It is well known that grazing by any species has an effect on population densities and distribution of forage species within a pasture. Pasture management on land, where man has had thousands of years to begin to understand it, is still not an exact science. Management of aquatic pastures is much newer and has many more unknown parameters, including the fact that it is three-dimensional. By deploying the upstream intercept array first, stabilizing it and then taking measurements downstream, it will be much easier to determine where another intercept array should be placed.

Appropriately placed intercept arrays of bivalve mollusks can remove a significant amount of these infectious agents with some of them being digested by the bivalve mollusk and with others being embedded within feces and pseudofeces ejected by the bivalve mollusk and falling to the bottom.

The infectious agents are prevented from escaping back into the water through the existence of mucous that binds the ejected material, and as the bivalve mollusks conduct their contribution to the inventive process, the body of water becomes more highly oxygenated, thereby enhancing the habitat for benthic fauna which aid in the destruction of the infectious agents or in their incorporation into the permanent sediments of the bottom.

SPECIFIC EXAMPLE OF HOW ONE WOULD PRACTICE THE INVENTIVE PROCESS IN BRETON BAY, Md.

Use the following methodology.

I. Select a body of water to be treated;

II. Evaluate the water body to see if it is suitable;

III. Select the location(S) for the inventive system;

IV. Locate the plume area;

V. Determine the type of array;

VI. Decide on the species of bivalve mollusk;

VII. Decide on the species of deposit feeders;

VIII. Size the intercept array;

IX. Review the check list for planning the array.

I. Select a Body of Water to be Treated

Figure 6:
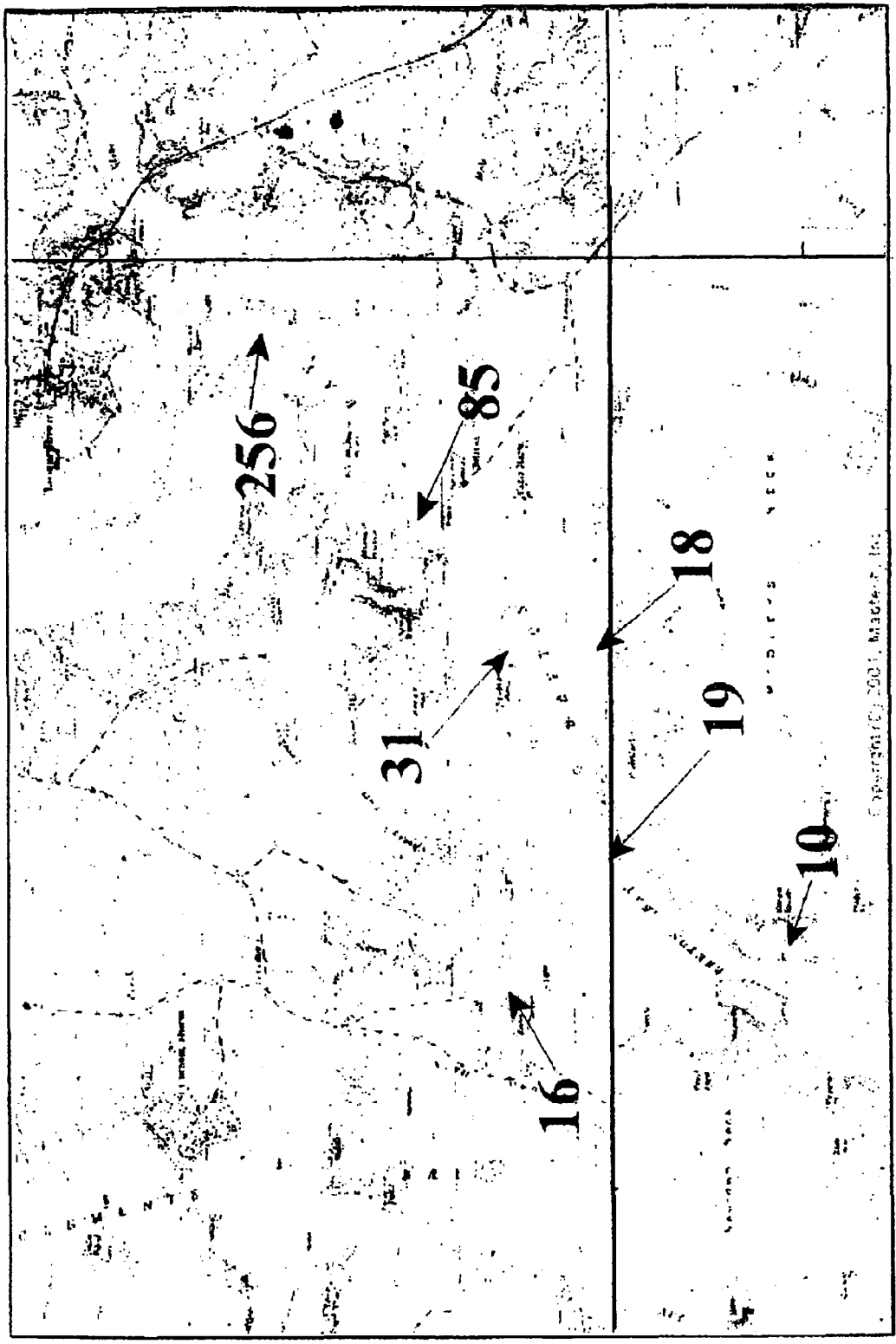
FIG. 6 shows fecal count levels at various stations throughout Breton Bay.

FIG. 6 depicts a region of the Chesapeake Bay known as Breton Bay showing levels of fecal coliform bacteria found at the seven test sites located throughout the same body of water which are used by MDE as an indicator for the presence of infectious agents.

Figure 7:
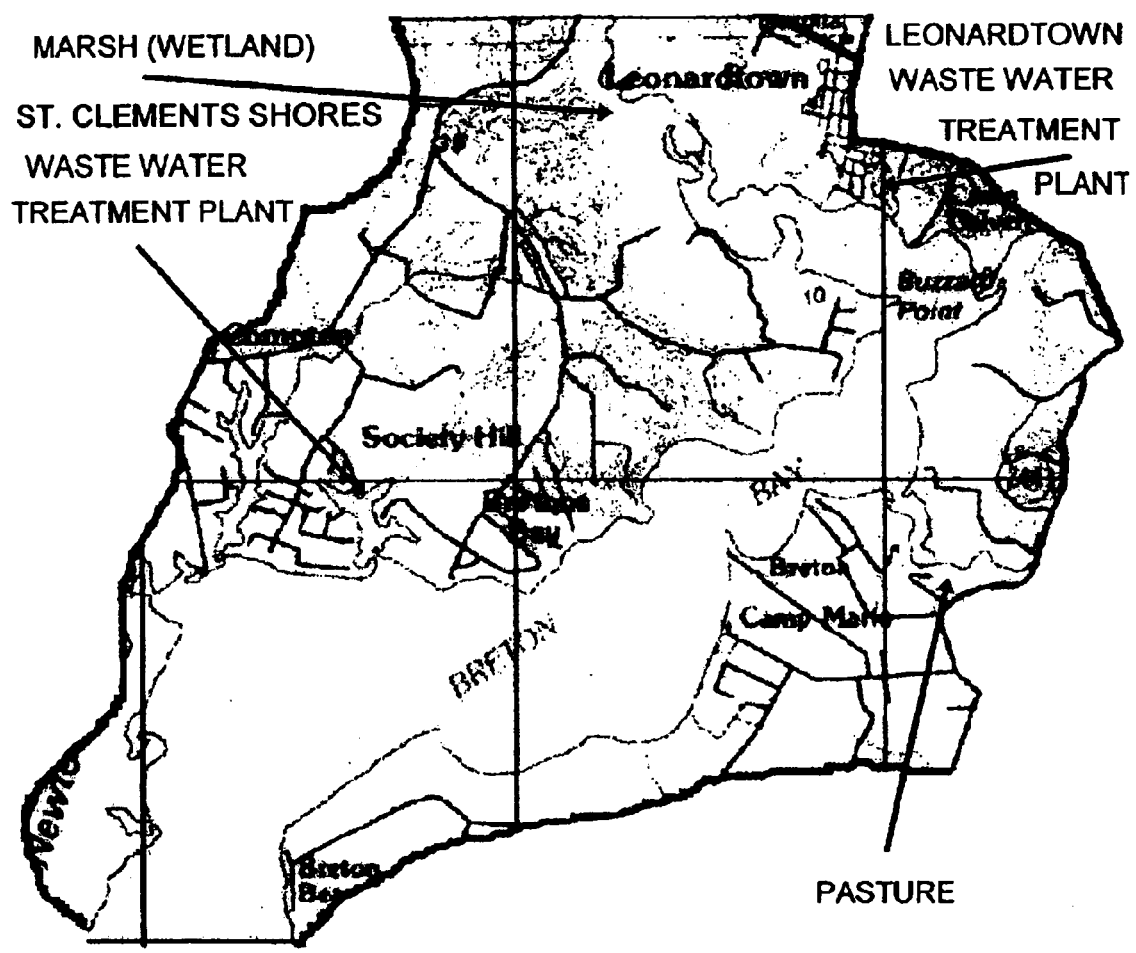
FIG. 7 shows a closer view of the topographic map of Breton Bay, Maryland with various parameters identified that must be taken into account when planning an array.

FIG. 7 shows the same body of water indicating the locations of two wastewater treatment plants requiring safety zones, incoming streams which are known to carry infectious agents, and a pasture area where there is a possibility of hazardous infectious agents being washed into the water after a rainfall event of 1 inch or more (Maryland Department of the Environment(MDE)). At the top left is another source of possible contamination. This tidal marsh contains wildlife of a type known to carry transmittable waterborne infectious agents.

II. Evaluate the Water Body To See if It Is Suitable

In evaluating the water body to see if it is suitable for practice of the present invention as explained above, it was found that tidal speed produces sufficient current and the fertility is eutrophic and as such will support the bivalve mollusks in the array. Eutrophic conditions must be modified to support benthic biota.

III. Select the Location(s) for the Inventive System

Figure 9:
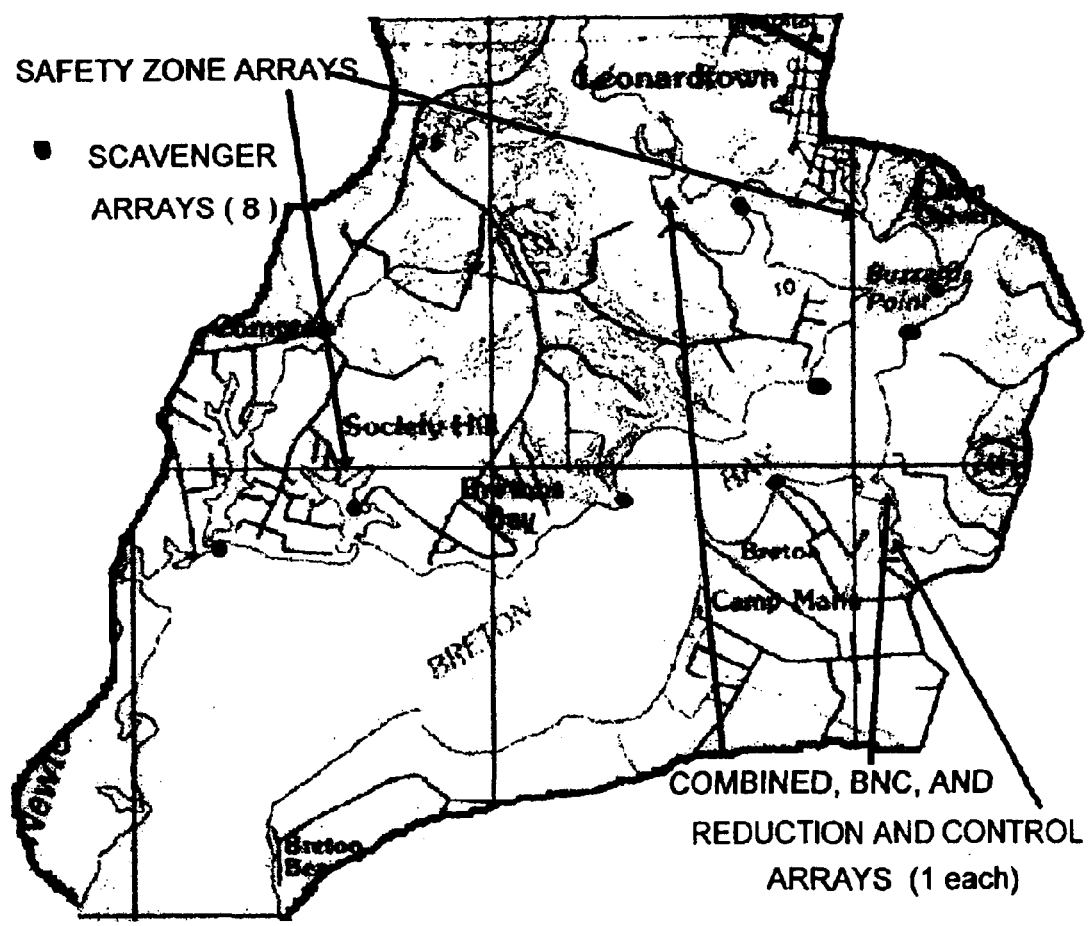
FIG. 9 shows a map of Breton Bay, Md. indicating 13 locations for various arrays suitable for treatment in accordance with the teachings of the present invention.

FIG. 9 shows the locations for thirteen suitable arrays within Breton Bay. Applicant has labeled sites that would be a suitable to practice the teachings of the present invention. Safety zone arrays will be placed close in shore at both wastewater facilities. A small submerged delta region has formed at the mouth of Town Run where it enters the bay and its current slows. This is also where and any potential spill from the Leonardtown Wastewater Treatment Plant will enter the bay, and is suitable for a safety zone intercept array. Shallows near shore where overflow from the St. Clements Shores Wastewater Treatment Plant would enter the bay in case of a spill were selected for a second safety zone array. Reduction and control intercept arrays are located at the entrances of two streams entering the Bay, Moll Dyers Run with its accompanying pastureland and McIntosh Run which flows through marshland supporting an abundance of wildlife at the head of Breton Bay.

The McIntosh Run array will also function as disclosed in Applicant's prior U.S. Pat. No. 6,391,201 intercept array and the Moll Dyers Run will be accompanied by another array as disclosed in Applicant's prior U.S. Pat. No. 6,391,201 located downstream which will also function as a scavenger intercept array. These additions are needed to reduce eutrophic conditions improving environmental quality for the benthic organisms in the plume areas of the various arrays.

Figure 8:
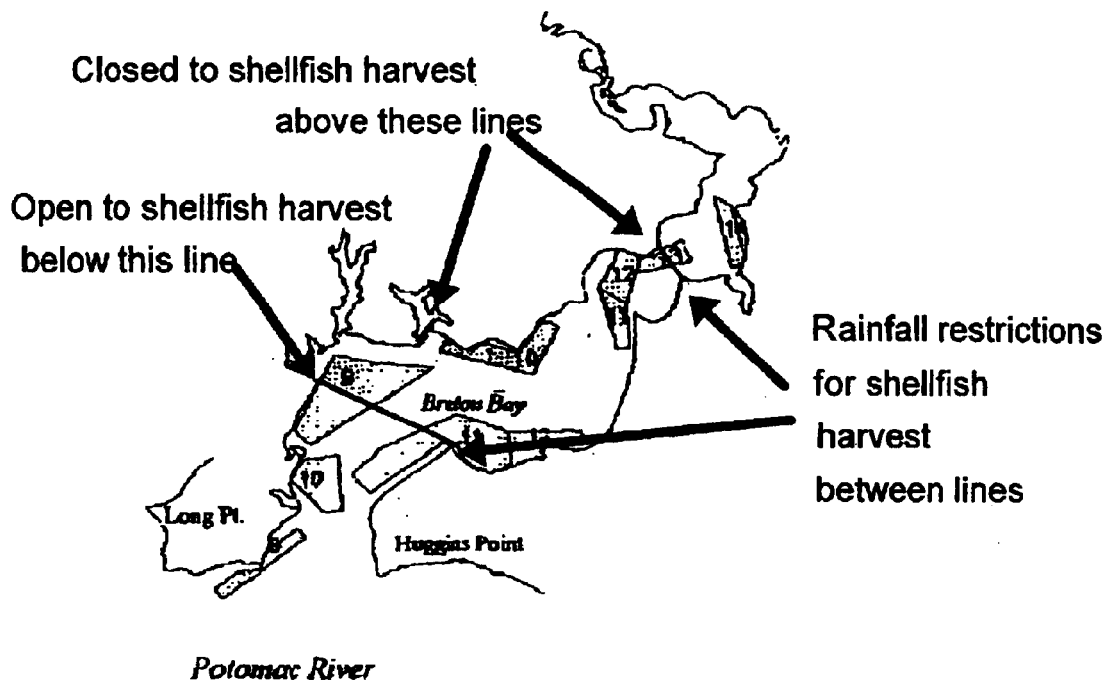
FIG. 8 shows historical oyster reefs in Breton Bay, Md. indicating hard bottoms which need to be avoided when placing an array.

Scavenger intercept arrays are located on points throughout Breton Bay because they have both good flows and shallow water making them the most effective sites. It is important to note that hard bottom found in areas of historical oysters bars have been avoided in siting all arrays (FIG. 8). Because this is salt water, it is not used currently for irrigation or public water supply so no sanitation array is necessary at this time.

IV. Locate the Plume Areas for Each Intercept Array

All blue line streams entering Breton Bay have arrays associated with them (FIG. 9). Nelson Run was provided with a only a scavenger array at this time. This stream has a small drainage basin which produces low flows. Nelson Run also drains a new development being constructed and is a potential silt source (which would negatively impact the effectiveness of any array). Once construction is finished and ground is stabilized Nelson Run will be evaluated for the need of a reduction and control array. All three of the other streams are blue line streams exhibiting year round flow. The flow from Town Run will impact the plume shape due to its proximity to the planned safety zone array. The plume in this case is expected to be the same shape as the submerged delta created by sediment from Town Run off the mouth of this creek. In the case of all other arrays, plume areas are expected to be typical for tidal estuarine arrays, fanning out from the array with ⅔rd of the deposit located upstream and ⅓rd downstream with the heaviest deposition nearest the array. The distance the material will spread from the array can be calculated using standard vector analysis. The factors that must be known are current speed, rate of fall of the deposition material (in this case feces and pseudofeces produced by the bivalve mollusks held in the array) and the distance to the bottom (from the position of the bivalve mollusks).

V. Determine the Type of Intercept Array

For the purpose of this example, this procedure was done at the time the array sites were planned. See section III above.

VI. Determination of the Species of Bivalve Mollusk for the Array

Throughout Breton Bay native oysters (*Crassostrea virginica*) are a viable choice for the various arrays because their environmental requirements are met and exceeded, except for the Safety zone array located by the Leonardtown Wastewater Treatment Plant where the water is quite fresh. *Corbicula fluminea* is thought to be the best choice for this array because of the fresh water that will flow through it from Town Run, and its voracious appetite and known ability to efficiently remove and destroy or sediment target IS organisms. Although Corbicula has little after harvest value at this time, the adults could be used to plant plume areas for arrays at a freshwater site.

VII. Determination of the Species of Deposit Feeders

In the cases of the safety zone intercept array to be located at the mouth of Town Run, enough fresh water is expected to require a more freshwater tolerant species. Therefore, *Rangia cuneata* appears to be a good prospect for planting here. Because it does not move deeply into salt water it is likely to stay in the plume area. Another plume where it could be tried is in the Reduction and Control array below the marsh on McIntosh Run. Due to eutrophic conditions exhibited at all of the other sites, planting of benthic animals would not likely be as successful until these conditions are mitigated. Natural colonization is expected to occur in these plumes over time as conditions improve.

VIII. The Intercept Array is Appropriately Sized

One example, Town Run, is given here. Normal discharge from the Leonardtown Sewage Disposal Plant is 680,000 gallons per day providing approximately ⅔ of the volume entering Breton Bay from Town Run. The total is approximately 1 million gallons per day (mgd); a safety factor of 2× flow is set (2 mgd). Clam Floats are sized to have a filtration capacity of 50,000 gallons per day (gpd). The *Rangia cuneata* clams planted in the plume will be expected to handle 40% of the normal flow, leaving 1.6 mgd (safety factor) necessary capacity for the array itself. Therefore, 32 (1,600,000/50,000=32) Clam Floats are expected to be needed for this array. It should be noted that initial design capacity is an estimate and operators should remain flexible and be ready to add or reduce capacity depending on verified test results. Several reasons for this are suggested by the literature. Way suggests that *Corbicula fluminea* adjust filtering rates to local conditions. See Way, C. M., D. J. Hornbach, C. A. Miller-Way, B. S. Payne and A. C. Miller, 1990, *Dynamics of Filter-Feeding in Corbicula Fluminea (Bivalvia: Cobuculidae)*, Can J. Zool 68:115–120. In addition, filtration rates vary seasonally with temperature, during low temperature conditions *Corbicula fluminea* filter lower volumes of water. See Lauritsen, D. D., 1986, *Filter-Feeding in Corbicula Fluminea and Its Effect on Seston Removal*, J. N. Am. Benth. Soc 5:165–172. The choice of this species in this instance is predicated on several reports such as the one by McMahon 1991. He reports that in the Potomac River (Maryland, USA) phytoplankton densities and chlorophyll concentrations declined up to 75% after water passed over the *Corbicula fluminea* beds. Vertical distribution of the bivalves throughout the water column will increase this effectiveness.

IX. Next, Go Over the Check List for Planning the Array

1) Reason for the need for infectious agent control and results desired; 13,000 people inhabit the Breton Bay watershed. Fecal coliform bacteria levels exceed state standards (14/100 ml) in an area covering 2.2 square miles of the bay. Results desired: reduce below state standards.

2) Sources and type of infectious agent: man, wildlife, domestic animals, point and non-point sources; Hepatitis A, *Giardia duodenalis*, and *Cryptosporidium parvum* were listed as infectious agents of concern in Breton Bay by a St. Mary's County Environmental Health official in a phone conversation. Viruses such as those causing Hepatitis are quite small and are not of a size that is normally filtered by shellfish. However, many of these organisms will be found associated directly with particulate matter that is of a size that shellfish filter and they will be removed along with the particle. Sedimentation is the likely fate of such viruses.

3) Residency time of the algae production area; adequate Breton Bay covers 5 square miles and is tidal throughout.

4) Flow rates through the system: calculated on tidal or in the case of 1 instance stream outflow.

5) Filtration capability of chosen bivalve mollusk species;

*Crassostrea virginica* 50 gpd at 3" and size of the target organisms is within range (due to size variations during the growth cycle, biomass should be used for calculating filtration rate during use of the system).

*Corbicula fluminea* 15.9 gpd at 1.5"

(use biomass for calculations here as well)

6) Depths of water throughout the system;

Channel depth ranges from 8 feet at the head to 15 feet in the central and lower Bay sloping to shallower suitable water near shore at the chosen intercept array sites.

7) Depth of photic zone initially and projected;

initial 0.8 meters, projected 2 meters

8) Stratification that can be expected; summer during times of neap tides, in the main channel.

9) Upwelling areas; these are not important due to over-enrichment and the resultant excessive algae production-throughout bay.

10) Projected littoral zones (areas where the planned depth of the photic zone exceeds the water depth). Along the shore in areas up to 2 meters in depth.

Parameters to be taken into account:

I. Flow rate, food load (include target organisms, and filtering capacity of bivalve mollusk biomass;
   I. Excessive food load
   II. Current contamination or safety zone
      I. Both
III. Location and type of contamination source or risk area
   I. sloping pasture, periodic grazing unfenced, 2 waste water treatment facilities with overflow hazard, storm water runoff from town, wildlife collection areas in marshland
IV. Upstream Residency time for algae; 3 days is required to maintain population equilibrium;
   I. Exceeds necessary time -continued V. Phytoplankton biomass will equal 3 days filtration rate of bivalve mollusks when system is balanced for mesotrophic conditions;
I. Requirement for the system disclosed in Applicant's prior U.S. Pat. No. 6,391,201 and combination system
VI. In eutrophic large water bodies, downstream mixing of cleared water is where the oxygenated micro-zone is expected to end and the plume must be well within this area.

Further research has provided the following data: Breton Bay has surface area of approximately 5 square miles, with a watershed drainage area of 60 square miles. Fecal coliform levels are greatest at the head of the bay where fecal coliform densities exceed state standards (200/ml) for swimming and water contact sports. Currently SAV distribution throughout the bay is poor (Dr. Bergstrom U.S. Fish and Wildlife Service) indicating eutrophic conditions. Large volumes of impervious surface run-off can enter at the head of the Bay around the town of Leonardtown in the case of storm events. The Leonardtown Sewage Treatment Plant discharges 0.68 mgd into Town Run. The plant has a history of overflows and equipment failure. It is in the process of being upgraded, although extreme care is being taken accidents are more likely to happen during any reconstruction and reconfiguration stage. Saint Clements Shores Sewage Treatment Plant has a design flow of 0.01 mgd for ground infiltration. The infiltration ponds have overflowed in the past.

Concerning pollutants, Applicant found that the Maryland Department of the Environment has determined that pollutants from run-off might include infectious agents. Applicant found that numbers of livestock and wildlife as well as man were present to maintain a biological base for infectious agents. Based upon fecal coliform counts, the Maryland Department of the Environment has decided that it would be best to close certain areas to harvest of shellfish for human consumption following any one-inch of rainfall in a 24 hour period in the mid-bay section. Excessive fecal coliform counts in the uppers Bay have caused the Department to close these waters at all times and a safety zone closure has been put in place around the St. Clements Shores Waste Water Treatment Plant. Based upon the information collected, Applicant has concluded that Breton Bay is a viable site to practice the present invention.

FIG. 9 shows the results of determining where to locate intercept arrays and the results of that determination. As shown in FIG. 9, thirteen arrays are located in appropriate locations. With particular reference to FIG. 7, Applicant undertook to study and determine the best locations. Historical oyster reefs (FIG. 8) were avoided due to hard bottom. The majority of fixed arrays and scavenger arrays are located in the upper part of the bay where fecal coliform counts exceed state limits as shown in FIG. 6.

Figure 10:
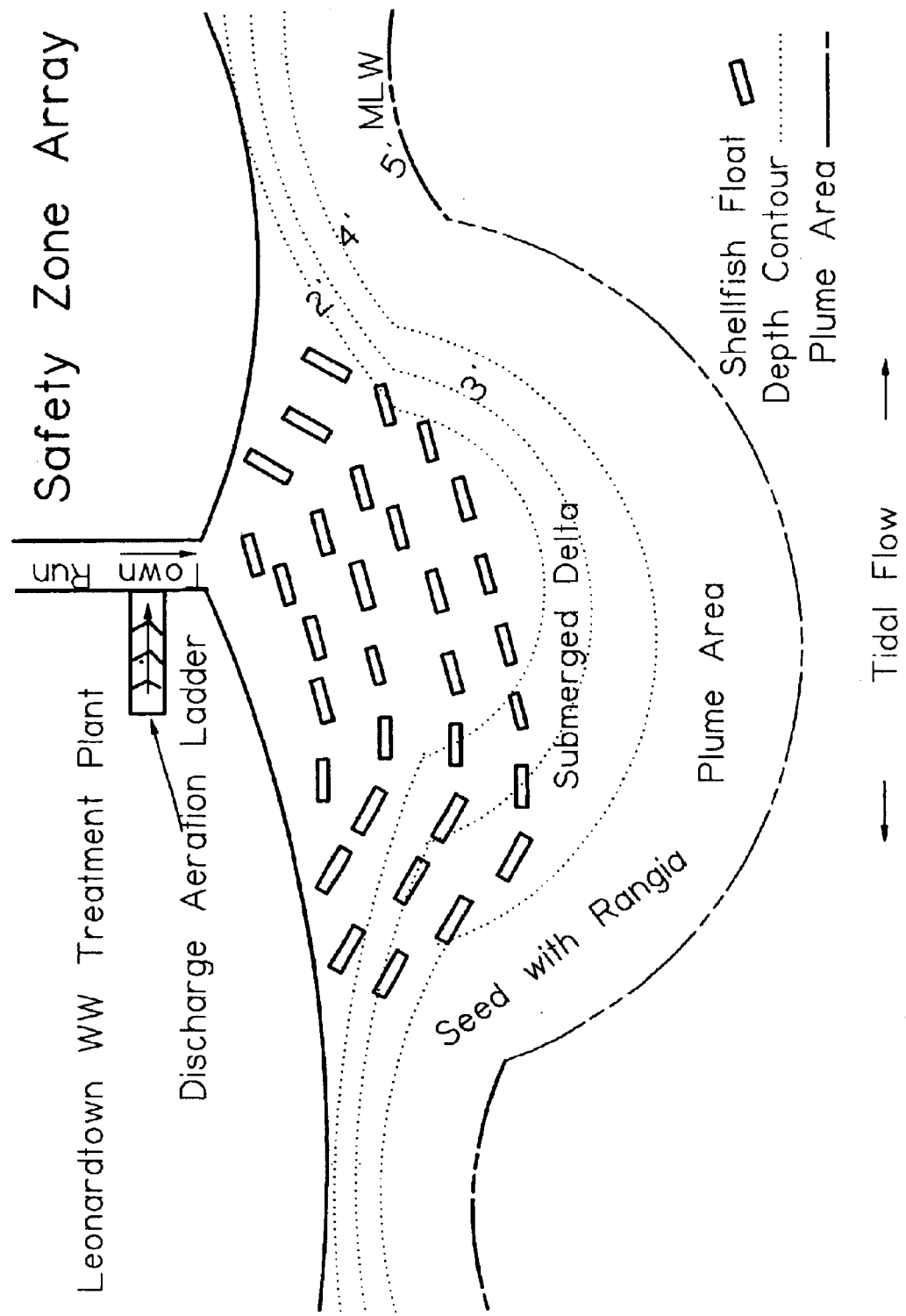
FIG. 10 is an illustrated drawing of a portion of Breton Bay, Md. showing further details of the Leonardtown Waste Water Treatment Plant Safety Zone Array concerning: water flow, phytoplankton production, and sources of infectious agents, or potential sources of these agents.

FIG. 10 shows the design of the safety zone intercept array for Town Run.

Figure 11:
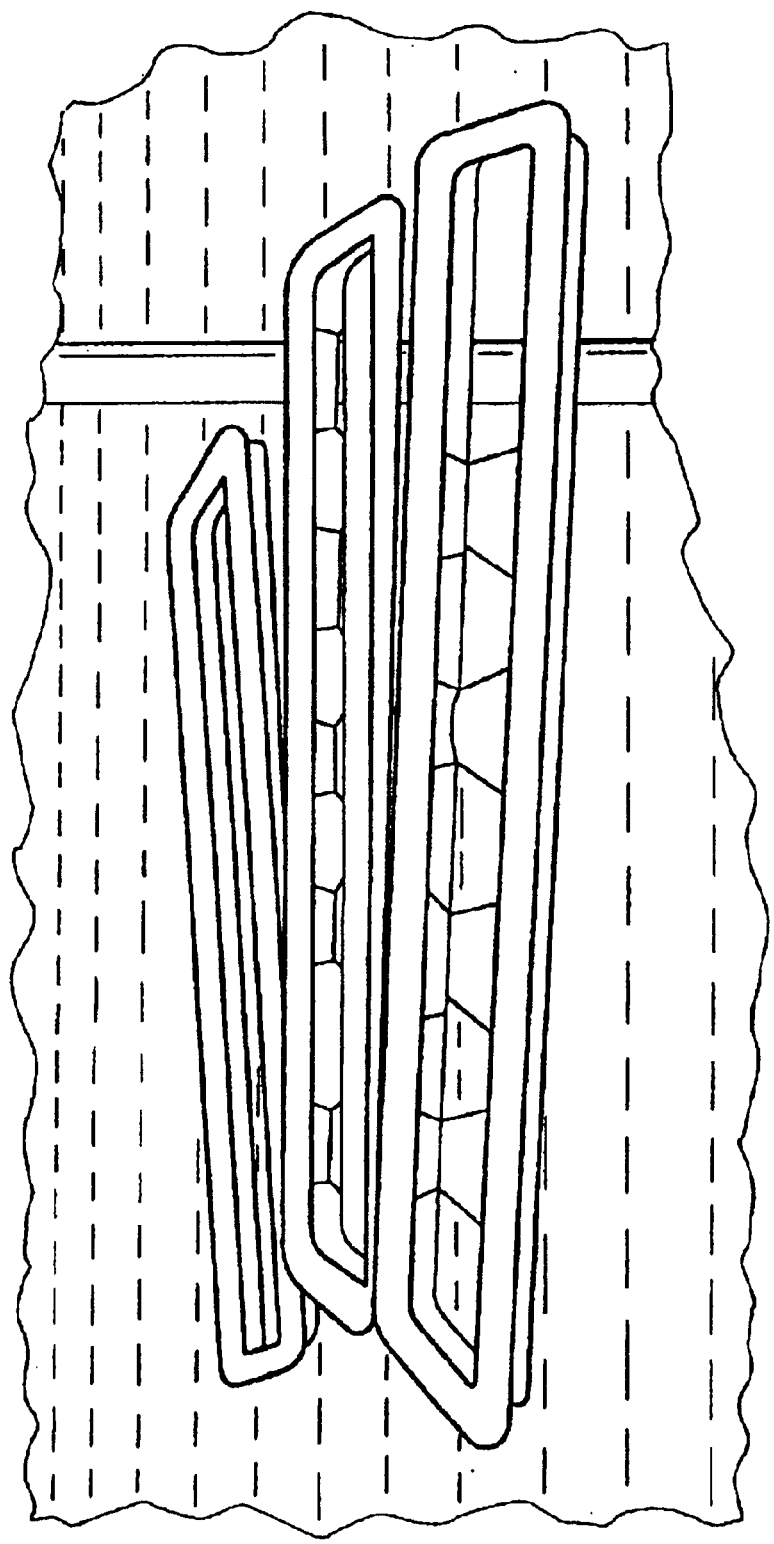
FIG. 11 shows a perspective view of a plurality of floating oyster reefs used in accordance with the teachings of the present invention.

FIG. 11 shows Floating Oyster Reefs including generally rectangular open floats with mesh material extending across each opening to retain bivalve mollusks therein as shown. Each of the oyster reefs depicted in FIG. 11 has a capacity of 1,000 three-inch oysters and, based upon the assumption that each oyster can filter 50 gallons of water per day, has a daily filtering capacity of 50,000 gallons of water. As explained above, control of the filtration rate of each array is exercised by either deploying additional bivalve mollusks or harvesting superfluous bivalve mollusks, as the case may be. *Corbicula fluminea* have been found to grow well in field enclosures (mesh bags) such as those employed in the floating oyster reef. See Thaddeus K. Graczyk, Ronald Fayer, Michael R. Cranfield, and David Bruce Conn, *In Vitro Interactions of Asian Freshwater Clam (Corbicula Fluminea) Hemocytes and Cryptosporidium Parvum Oocysts*, Applied and Environmental Microbiology, July, 1997, p. 2910–2912. Sufficient numbers of the bivalve mollusk can be maintained in the same system to have equivalent filtration rates. As also explained above, an important aspect of the present invention consists of making sure that each oyster reef suspends the bivalve mollusks off the bottom or sea bed of the body of water where the inventive process is being practiced. *C. virginica* showed that it has the ability to remove these infective agents. See Graczyk, Thaddeus K., C. A. Farley, R. Fayer, E. J. Lewis, and J. M. Trout, *Detection of Cryptosporidium pocysts and Giardia Cysts in the Tissues of Easter Oysters (Crassostrea Virginica) Carrying Principal Oyster Infectious Diseases*, Journal of Parasitology, 84(5), 1998, p. 1039. It is known that one 3" oyster can remove all of the significant materials from about 50 gallons of water per day.

Figure 12:
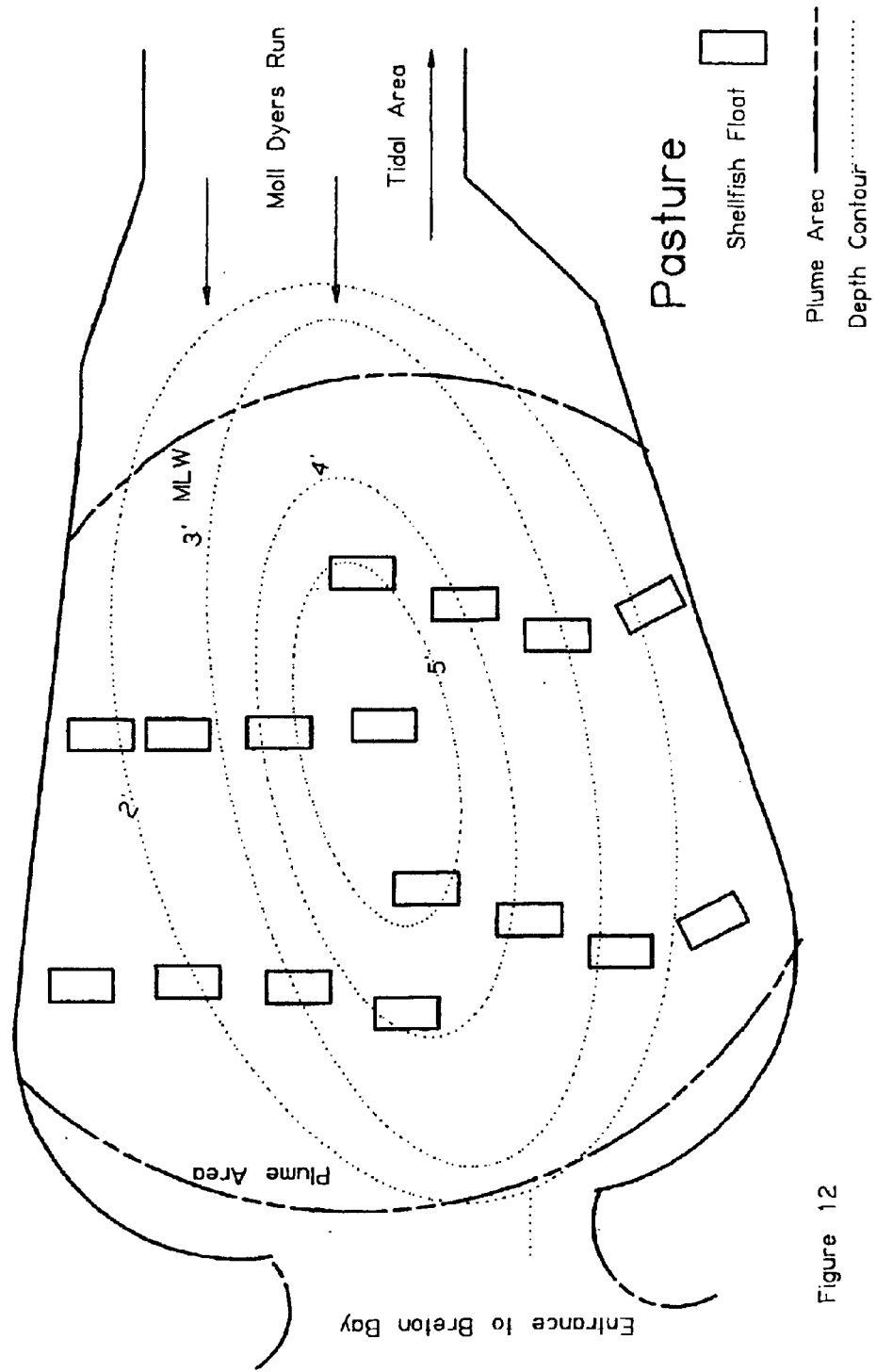
FIG. 12 shows a schematic representation of a portion of Breton Bay shown in 9 showing further details of the Moll Dyers Run Reduction and Control Array concerning water flow, phytoplankton production, and sources of infectious agents, or potential sources of these agents.
Figure 13:
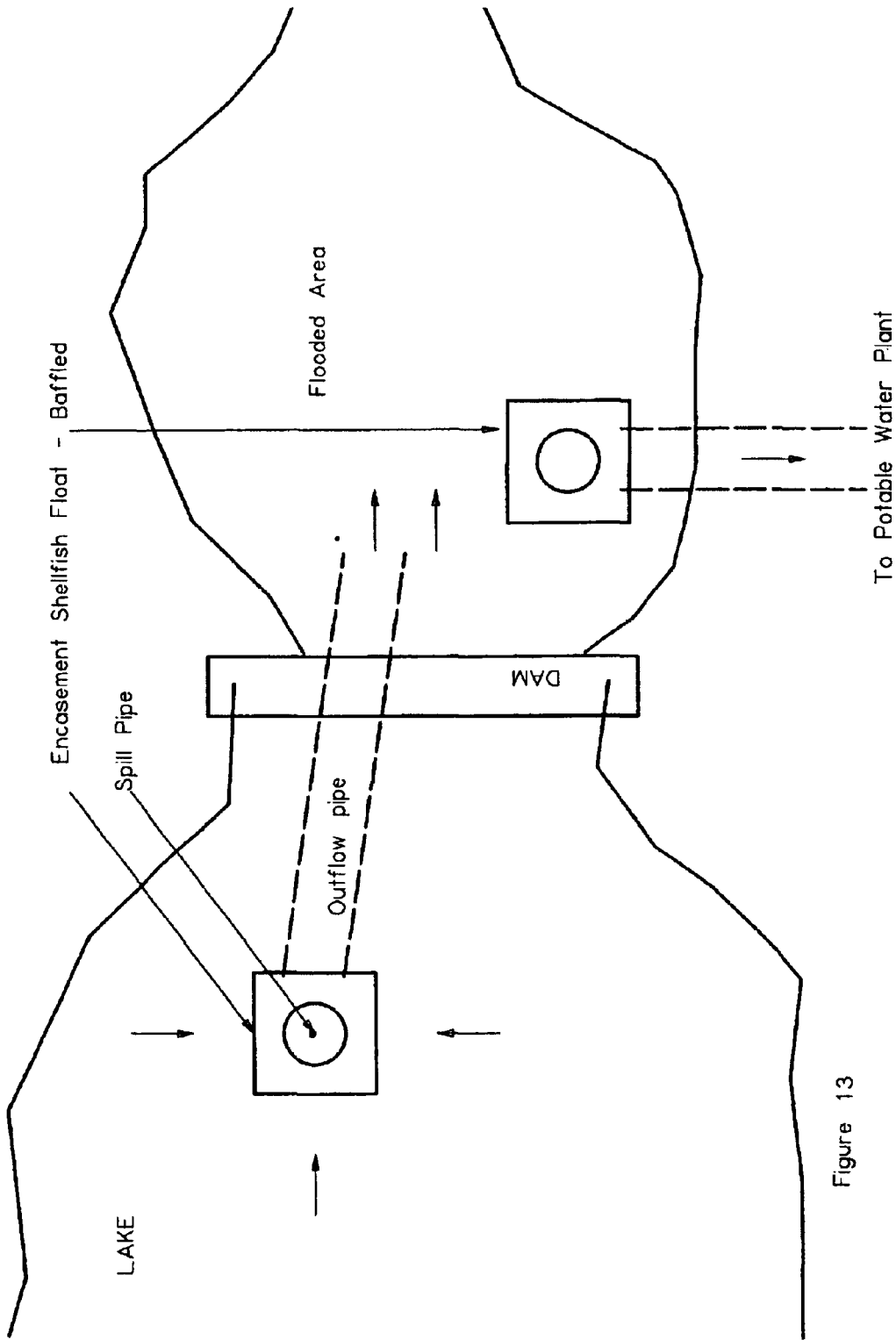
FIG. 13 shows a schematic representation of a portion of a freshwater impoundment (Lake Lariat, Calvert County, Md.) showing details of a Sanitary Array to be used in the pretreatment of potable water. Water flow is designated by arrows, phytoplankton production occurs in the main body of the lake, and sources of infectious agents include wildlife and failed septic systems.

FIG. 12 shows a schematic representation of a Reduction and Control Array. The water flowing into Breton Bay from Moll Dyers Run and drainage from the pasture carry infectious agents to the array. Abundant phytoplankton production occurs in Breton Bay and is carried to the shellfish in the array on the incoming tide. The desired outcome for this reduction and control array is to lower existing pathogen numbers to below infectious rates and maintain that condition. The array is placed so that it intercepts the bulk of infectious agents as they first enter the controlled area which in this instance is the entirety of Breton Bay. The array is designed so that it controls the level of infectious agents at the expected range of flows from the contamination source. The volume of water to be treated is calculated using storm event data added to base stream flows to add a margin of safety. This maximum flow rate and the bivalve's (in this case oysters) filtration rate are used to calculate the bivalve mollusks biomass needed.

FIG. 13 shows a schematic representation of a portion of a freshwater impoundment (Lake Lariat, Calvert County, Md.) showing details of a Sanitary Array to be used in the pretreatment of potable water. The spill pipe is encased with float baffles directing all of the water to flow through multiple layers of shellfish, in this case, a freshwater clam, *Corbicula fluminea*, is chosen. All of the water must flow through this device before leaving the lake. The water from the spillway then enters a small flooded control area and must flow through a second encasement float of the same or similar design. A supply of phytoplankton is produced in the main body of the lake. However, these Sanitation Arrays are designed to filter and re-filter the water multiple times so that infectious agents are removed with a sufficient margin of safety. The Sanitation Arrays are not deployed alone and will have other arrays such as Reduction and Control and Scavenger Arrays deployed in conjunction with them. Rotation of the shellfish in the array is necessary because those closest to the potable water plant will not receive the necessary amounts of sustenance. Rotation will bring the bivalves which have received the least amount of food to the front of the array where the maximum of food is available. All of the others will then be moved closer to the potable water plant. In this way, the infectious agents from all sources (including but not limited to wildlife and failed septic systems) will be first reduced in number by Reduction and Control and Scavenger Arrays and thoroughly treated by the two Sanitation Arrays shown in FIG. 13.

Figure 14:
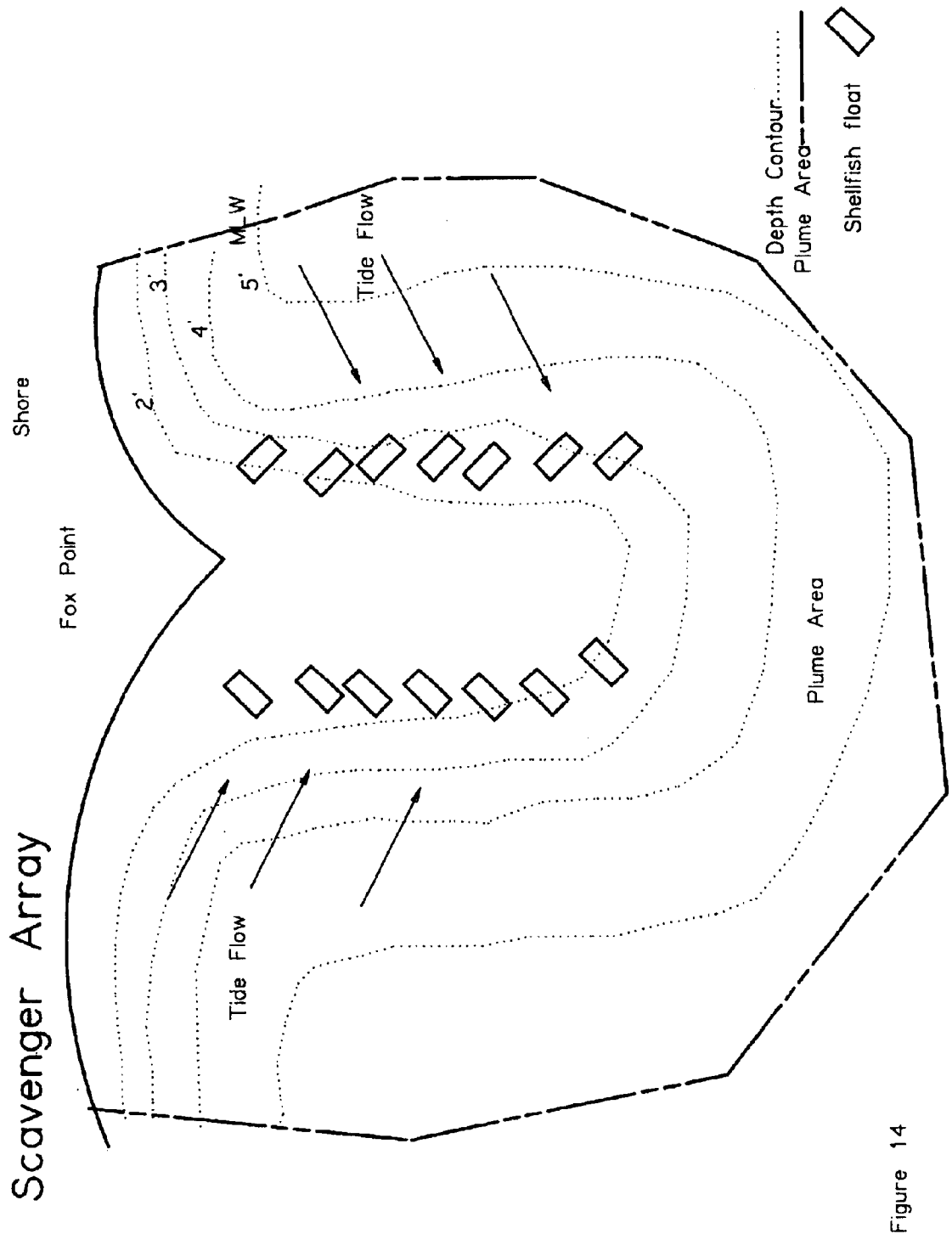
FIG. 14 shows a schematic representation of a portion of Breton Bay illustrated in 9 showing further details of the Fox Point Scavenger Array concerning water flow, phytoplankton production, and sources of infectious agents, or potential sources of these agents.

FIG. 14 shows a schematic representation of a Scavenger Array for a location known as Fox Point in Breton Bay. This Scavenger Array is placed to augment the Moll Dyers Run Reduction and Control Array (FIG. 12) in order to remove infectious agents that were present prior to emplacement of that array and further reduce numbers of infectious agents that may get past the Moll Dyers Run Array from time to time such as after a heavy rainfall causing greater than usual amounts of infectious material to enter the water. The Scavenger Array also removes infectious agents that are directly deposited in the controlled area by wildlife or other sources. This Scavenger Array is placed to intercept infectious agents swept to the bivalves on the tide. Sufficient phytoplankton production occurs throughout Breton Bay to feed the shellfish held in the Scavenger Array.

Figure 15:
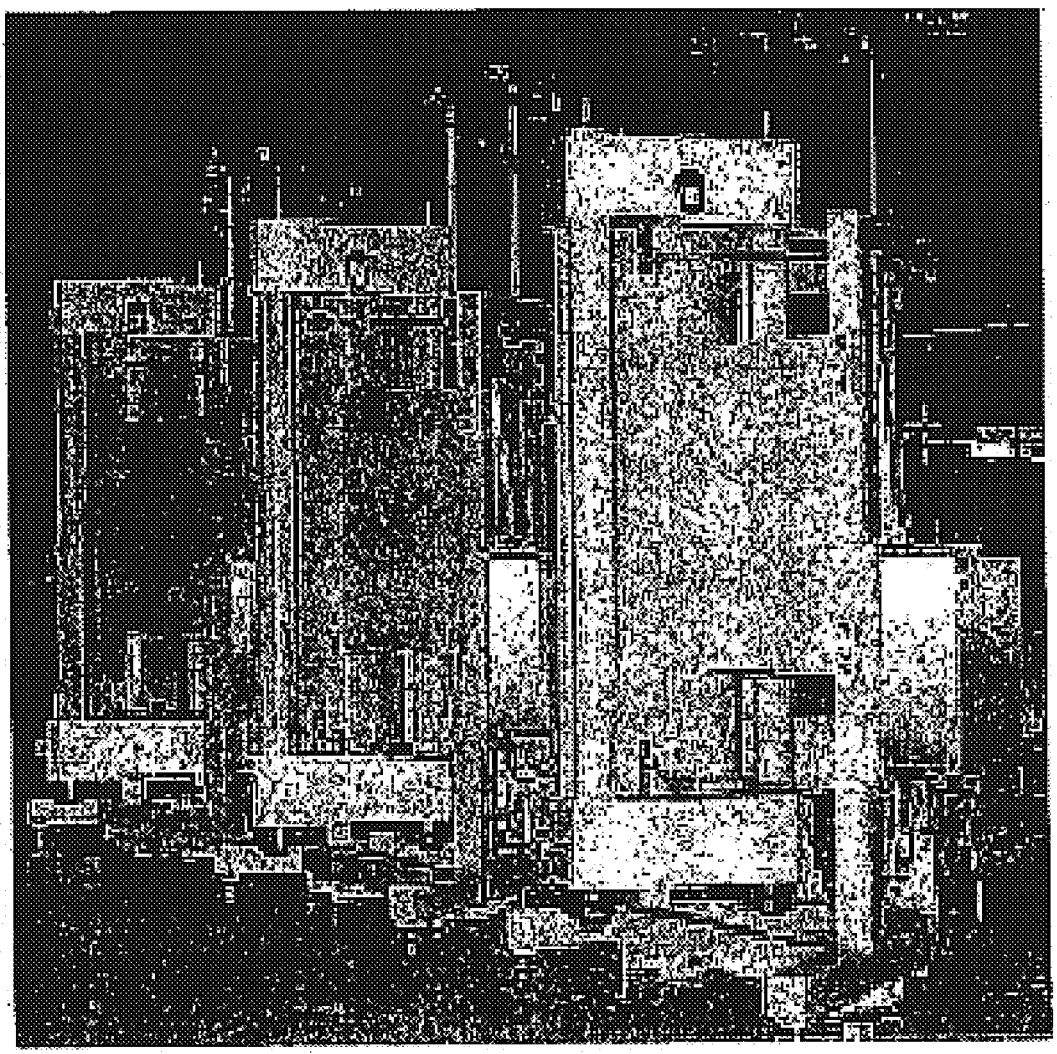
FIG. 15 shows continuous process machines produced by Flow International Corporation, Kent, Wash., usable to pressure shuck raw shellfish, while destroying infectious agents.

FIG. 15 shows a device designed to disinfect shellfish such as those harvested from the various arrays. Fresh (raw) oysters can be made safe from Vibrio bacteria by Fresher Under Pressure:

A pressure of 200 to 300 MPa for 5 to 15 minutes at 25C inactivated;

*Vibrio parahaemolyticus* ATCC 17803;

*Vibrio vulnificus* ATCC 27562;

*Vibrio choleare* ATCC 14035;

*Vibrio choleare* non-0:1 ATCC 14547;

*Vibrio hollisae* ATCC 33564;

*Vibrio mimicus* ATCC 33653.

See "D. Berlin, D. Herson, D. Hicks, and D. Hoover; Applied and Environmental Microbiology, June 1999."

Pressure Inactivation of Listeria monocytogenes at 600 MPa (87,000 psi) time 3 minutes. Kill pressures in KSI:

|  |  |
|---|---|
| Parasites | 40 |
| Yeast/mold | 60 |
| Pathogenic bacteria | <90 |
| Non-pathogenic bacteria | >90 |
| Viruses from | 30 |
| Spores | 140 |

See Dr. Edmund Ting eting@flowcorp.com Flow International Corporation. This continuous process shucking machine produced by Flow International Corporation, Kent, Washington, "pasteurizes" or deactivates any live infectious agents found in the shellfish rendering them safe to eat without heat. When the shellfish are placed in this machine, taken to the appropriate pressure and held there for a specified time, the shellfish are shucked by the process uncooked. The process also deactivates all of the infectious agents found on the outside of the bivalve shells rendering the bi-product safe for handling and other uses.

As such, an invention has been disclosed in terms of preferred embodiments thereof which fulfill each and every one of the objects of the invention as set forth above and provide a new and useful method for biological control of waterborne disease organisms, parasites and other infectious agents of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A process for modifying and controlling infectious agent levels that afflict animals, plants, and man in a body of water including the steps of:
    a) identifying an area of moving water within said body of water;
    b) choosing a bivalve mollusk species known to thrive in said body of water;
    c) providing at least one intercept array designed to receive and retain a plurality of bivalve mollusks, said at least one intercept array allowing water flow therethrough;
    d) inserting a plurality of bivalve mollusks into said at least one intercept array;
    e) placing said at least one intercept array within said body of water suspended above a bottom thereof;
    f) said at least one intercept array filtering infectious agents out of said body of water, thereby reducing infectious agent levels in said body of water; and
    g) burying and entombing infectious agents in the bottom of said body of water.

2. The process of claim 1, wherein said identifying step includes the step of deciding upon a body of water to be treated, chosen from the group consisting of a lake, pond, stream, river, estuary or ocean bay.

3. The process of claim 2, wherein said deciding step includes the step of determining characteristics of said body of water including temperature range and salinity range.

4. The process of claim 3, wherein said determining step includes the step of determining ability of said area to support life of phytoplankton, benthic infauna and bivalve mollusks.

5. The process of claim 1, wherein said identifying step includes the step of locating or creating flow speeds of moving water and deciding upon an area, either located or created, where flow speed is in a range of 0.2 to 4.0 knots.

6. The process of claim 1, wherein said providing step includes the step of providing an enclosure including:
    a) a structure causing said enclosure to hold bivalve mollusks above a bottom of said body of water;
    b) mesh material connected to said structure to create a mesh enclosure;
    c) said bivalve mollusks being retained within said mesh enclosure.

7. The process of claim 6, further including the step of periodically harvesting said bivalve mollusks and thereafter providing replacement bivalve mollusks in place thereof.

8. The process of claim 1, further including the step of periodically harvesting said bivalve mollusks and thereafter providing replacement bivalve mollusks in place thereof.

9. The process of claim 1, wherein said inserting step includes the step of inserting oysters.

10. The process of claim 9, wherein said oysters are known by the name *Crassostrea virginica*.

11. The process of claim 1, wherein said inserting step includes the step of inserting mussels.

12. The process of claim 1, wherein said inserting step includes the step of inserting clams.

13. The process of claim 1, further including the step of filtering infectious agents from said body of water and sedimenting said infectious agents to the bottom of said body of water in the form of feces or pseudofeces.

14. The process of claim 1, further including the step of filtering infectious agents from said body of water and digesting of said infectious agents through a process chosen from the group consisting of intracellular digestion and extracellular digestion, and thereby destroying said infectious agents.

15. The process of claim 1, further including the step of filtering infectious agents from said body of water and encapsulating said infectious agents in feces or pseudofeces.

16. The process of claim 1, wherein said at least one array comprises a plurality of arrays.

17. The process of claim 1, wherein said body of water includes a defined water inlet conduit and a defined water outlet conduit, and said placing step includes the steps of:
 a) placing at least one array in surrounding relation to said inlet conduit, whereby all water exiting said inlet conduit must flow through said at least one array; and
 b) placing at least one array in surrounding relation to said outlet conduit, whereby all water exiting said body of water via said outlet conduit must first pass through said at least one array.

18. The process of claim 17, further including the step of periodically rotating said arrays about said inlet and outlet, respectively.

19. The process of claim 1, wherein said body of water includes a defined water inlet conduit, and said placing step includes the step of placing said at least one array in surrounding relation to said inlet conduit, whereby all water exiting said inlet conduit must flow through said at least one array.

20. The process of claim 19, further including the step of periodically rotating said at least one array about said inlet.

21. The process of claim 1, wherein said body of water includes a defined water outlet conduit, and said placing step includes the step of placing said at least one array in surrounding relation to said outlet conduit, whereby all water exiting said body of water via said outlet conduit must first pass through said at least one array.

22. The process of claim 21, further including the step of periodically rotating said at least one array about said outlet.

23. A process for modifying and controlling infectious agent levels in a body of water chosen from the group consisting of a lake, pond, stream, river, estuary or ocean bay including the steps of:
 a) identifying an area of water within said body of water flowing at a speed in the range of 0.2 to 4.0 knots;
 b) choosing a bivalve mollusk species known to thrive in said body of water;
 c) providing at least one intercept array designed to receive and retain a plurality of bivalve mollusks, said at least one intercept array allowing water flow therethrough, and comprising an enclosure including:
  i) a float structure causing said enclosure to float above a bottom of said body of water;
  ii) mesh material connected to said float structure to create a mesh enclosure;
  iii) said bivalve mollusks being retained within said mesh enclosure;
 d) inserting a plurality of bivalve mollusks into said enclosure;
 e) placing said at least one intercept array within said body of water suspended above a bottom thereof;
 f) said at least one intercept array filtering infectious agents out of said body of water, thereby reducing infectious agent population levels in said body of water; and
 g) burying and entombing infectious agents in the bottom of said body of water.

24. The process of claim 23, further including the step of periodically harvesting said bivalve mollusks and thereafter providing replacement bivalve mollusks in place thereof.

25. The process of claim 23, wherein said inserting step includes the step of inserting oysters.

26. The process of claim 25, wherein said oysters are known by the name *Crassostrea virginica*.

27. The process of claim 23, wherein said identifying step includes the step of locating or creating flow speeds of moving water and deciding upon an area, either located or created, where flow speed is in a range of 0.2 to 4.0 knots.

\* \* \* \* \*